US008254403B2

(12) United States Patent
Hashimoto

(10) Patent No.: US 8,254,403 B2
(45) Date of Patent: Aug. 28, 2012

(54) PACKET FORWARDING APPARATUS AND CONTROLLING METHOD

(75) Inventor: Haruhiko Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 492 days.

(21) Appl. No.: 12/285,366

(22) Filed: Oct. 2, 2008

(65) Prior Publication Data
US 2009/0180475 A1 Jul. 16, 2009

(30) Foreign Application Priority Data

Jan. 10, 2008 (JP) ................................. 2008-003694

(51) Int. Cl.
*H04L 12/26* (2006.01)
*H04L 12/28* (2006.01)
*H04L 12/56* (2006.01)

(52) U.S. Cl. ... 370/429; 370/230; 370/392; 370/395.72; 370/412

(58) Field of Classification Search ................. 370/229, 370/230, 412
See application file for complete search history.

(56) References Cited

U.S. PATENT DOCUMENTS

| 5,475,682 | A  | * | 12/1995 | Choudhury et al. | 370/229 |
| 6,175,554 | B1 | * | 1/2001  | Jang et al.      | 370/229 |
| 6,658,014 | B1 |   | 12/2003 | Tezuka           |         |
| 6,687,254 | B1 | * | 2/2004  | Ho et al.        | 370/412 |
| 7,006,440 | B2 | * | 2/2006  | Agrawal et al.   | 370/235 |
| 7,213,087 | B1 | * | 5/2007  | Bertone et al.   | 710/56  |
| 7,362,705 | B2 | * | 4/2008  | Beukema et al.   | 370/230 |

| 2003/0081546 | A1 | * | 5/2003  | Agrawal et al.      | 370/229    |
| 2003/0112755 | A1 | * | 6/2003  | McDysan             | 370/230    |
| 2003/0117958 | A1 | * | 6/2003  | Nation et al.       | 370/235    |
| 2003/0123392 | A1 | * | 7/2003  | Ruutu et al.        | 370/235    |
| 2003/0142676 | A1 | * | 7/2003  | Zeisz et al.        | 370/395.1  |
| 2003/0172104 | A1 | * | 9/2003  | Hooman et al.       | 709/103    |
| 2003/0198220 | A1 | * | 10/2003 | Gross et al.        | 370/389    |
| 2003/0202517 | A1 | * | 10/2003 | Kobayakawa et al.   | 370/395.4  |
| 2004/0213266 | A1 | * | 10/2004 | Willhite et al.     | 370/395.43 |

(Continued)

FOREIGN PATENT DOCUMENTS

JP 9-219706 8/1997

(Continued)

OTHER PUBLICATIONS

Japanese Office Action mailed Dec. 6, 2011 issued in corresponding Japanese Patent Application No. 2008-003694.

*Primary Examiner* — Marsha D Banks Harold
*Assistant Examiner* — Christopher Wyllie
(74) *Attorney, Agent, or Firm* — Staas & Halsey LLP

(57) ABSTRACT

A packet forwarding apparatus identifies the class of the received packet, determines whether there is a capacity for storing the received packet, spending a dedicated free capacity corresponding to the identified class, stores the packet in the buffer, spending the corresponding dedicated free capacity if there is the capacity for storing the packet, determines whether the packet may be stored spending a jointly owned free capacity if the packet may not be stored spending the dedicated free capacity, stores the packet in the buffer, spending the corresponding jointly owned free capacity if there is the capacity for storing the packet, discards the packet if the packet may not be stored spending the jointly owned free capacity, and selects a predetermined class according to a priority control and reads out the packet from the buffer for transmission.

10 Claims, 21 Drawing Sheets

U.S. PATENT DOCUMENTS

| | | | |
|---|---|---|---|
| 2005/0038793 A1* | 2/2005 | Romano et al. | 707/100 |
| 2005/0169172 A1* | 8/2005 | Wang et al. | 370/229 |
| 2005/0286420 A1* | 12/2005 | Kusumoto | 370/230 |
| 2007/0115826 A1* | 5/2007 | Chow | 370/235 |
| 2009/0013175 A1* | 1/2009 | Elliott | 713/154 |
| 2009/0180475 A1* | 7/2009 | Hashimoto | 370/392 |

FOREIGN PATENT DOCUMENTS

| | | |
|---|---|---|
| JP | 11-41243 | 2/1999 |
| JP | 2000-244517 | 9/2000 |
| JP | 2005-012431 | 1/2005 |
| JP | 2005-012434 | 1/2005 |
| JP | 2005-244417 | 9/2005 |

* cited by examiner

| PORT | CLASS | LOCATION INFORMATION (EARLY←→LATE) | | | | |
|---|---|---|---|---|---|---|
| #1 | A | 001 | 005 | 009 | | |
| #1 | B | | | | | |
| #1 | C | | | | | |
| #1 | D | | | | | |
| ⋮ | ⋮ | | | | | |
| | | | | | | |
| | | | | | | |

FIG.6A

| PORT | CLASS | DEDICATED SPENDING CAPACITY | CURRENT DEDICATE SPENDING CAPACITY | CURRENT DEDICATED FREE CAPACITY |
|---|---|---|---|---|
| #1 | A | 50 | 30 | 20 |
| #1 | B | 50 | 0 | 50 |
| #1 | C | 0 | 0 | 0 |
| #1 | D | 0 | 0 | 0 |
| | | | | |

FIG.6B

| PORT | CLASS | JOINTLY OWNED SPENDING CAPACITY | CURRENT JOINTLY OWNED SPENDING CAPACITY | CURRENT JOINTLY OWNED FREE CAPACITY |
|---|---|---|---|---|
| #1 | A, B, C | 50 | 0 | 50 |
| #1 | A, B, D | 50 | 0 | 50 |
| | | | | |
| | | | | |
| | | | | |

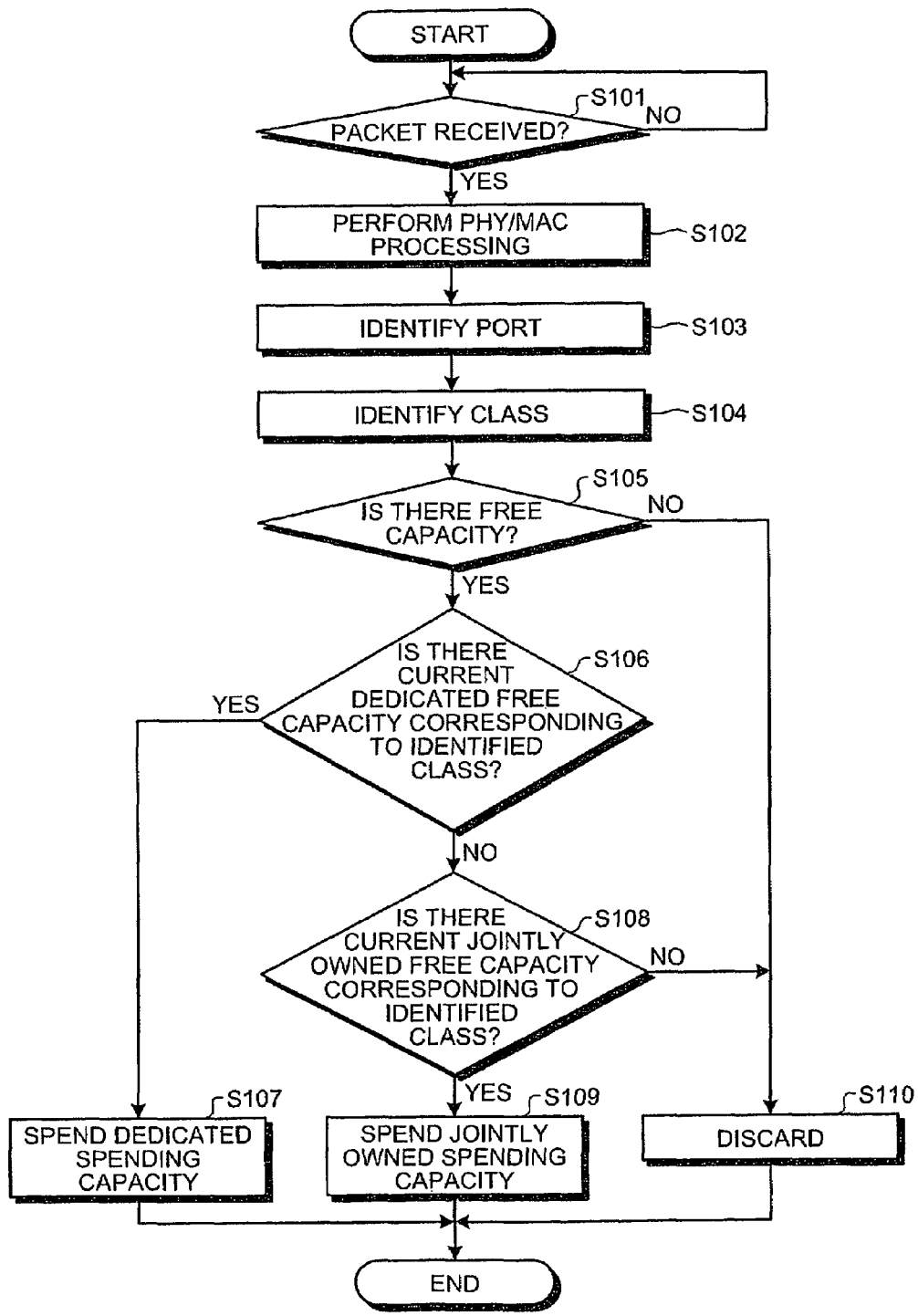

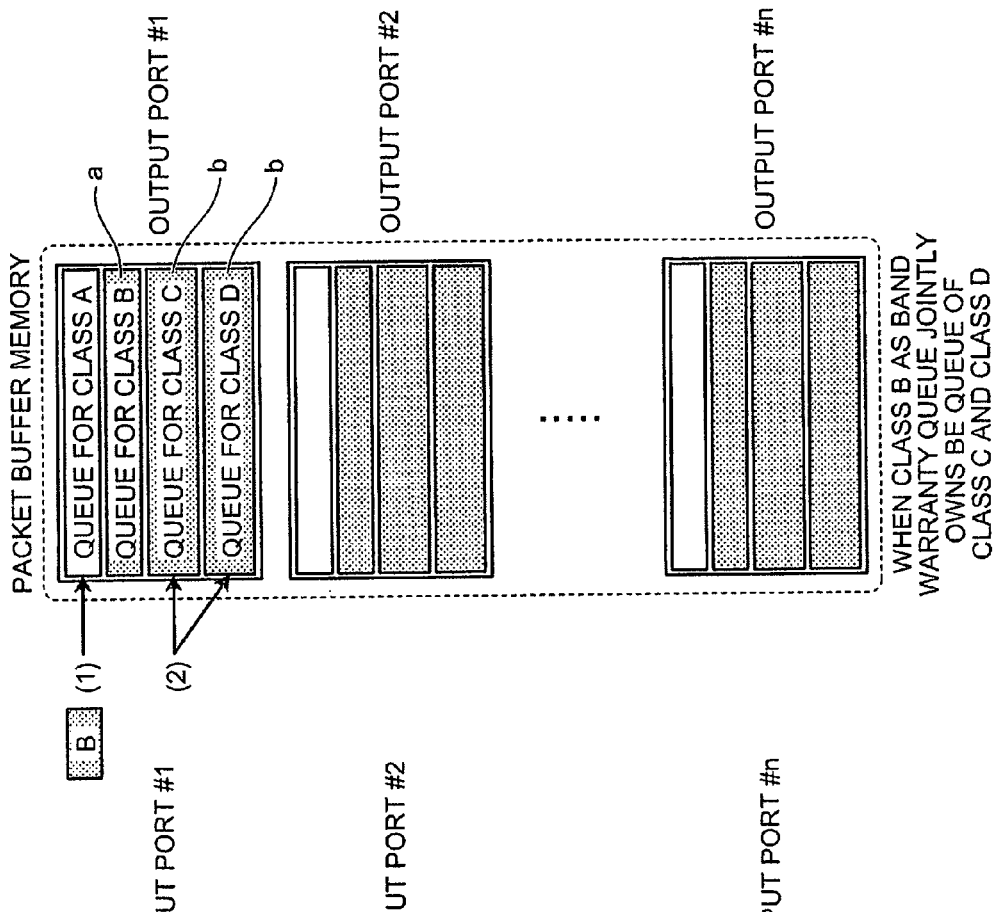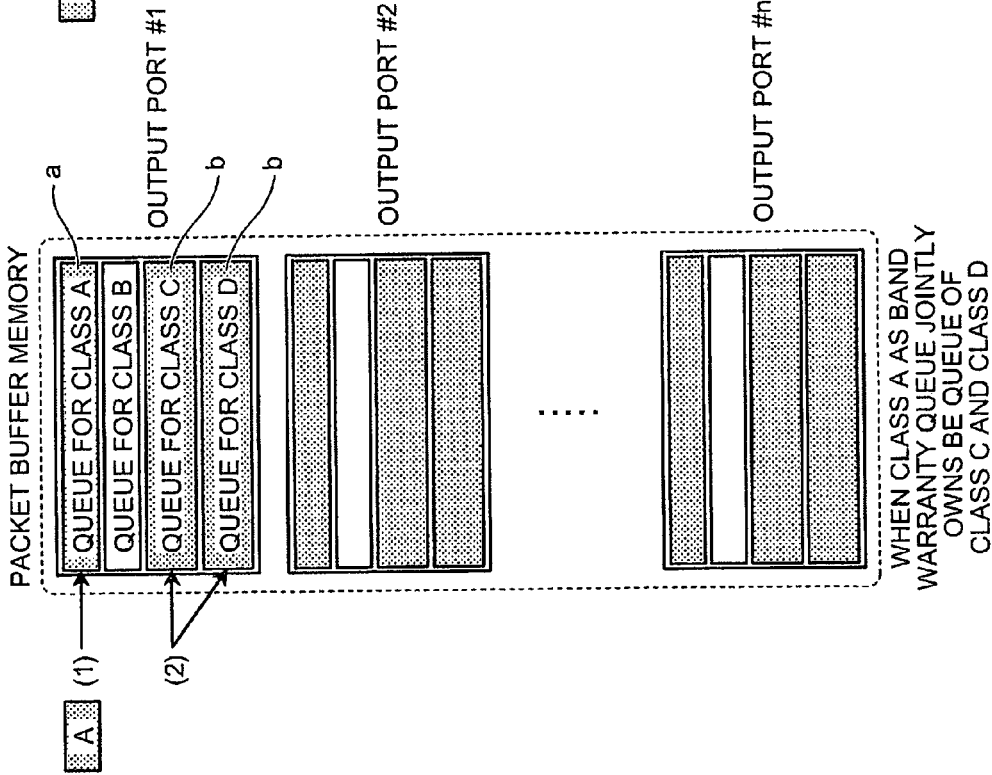

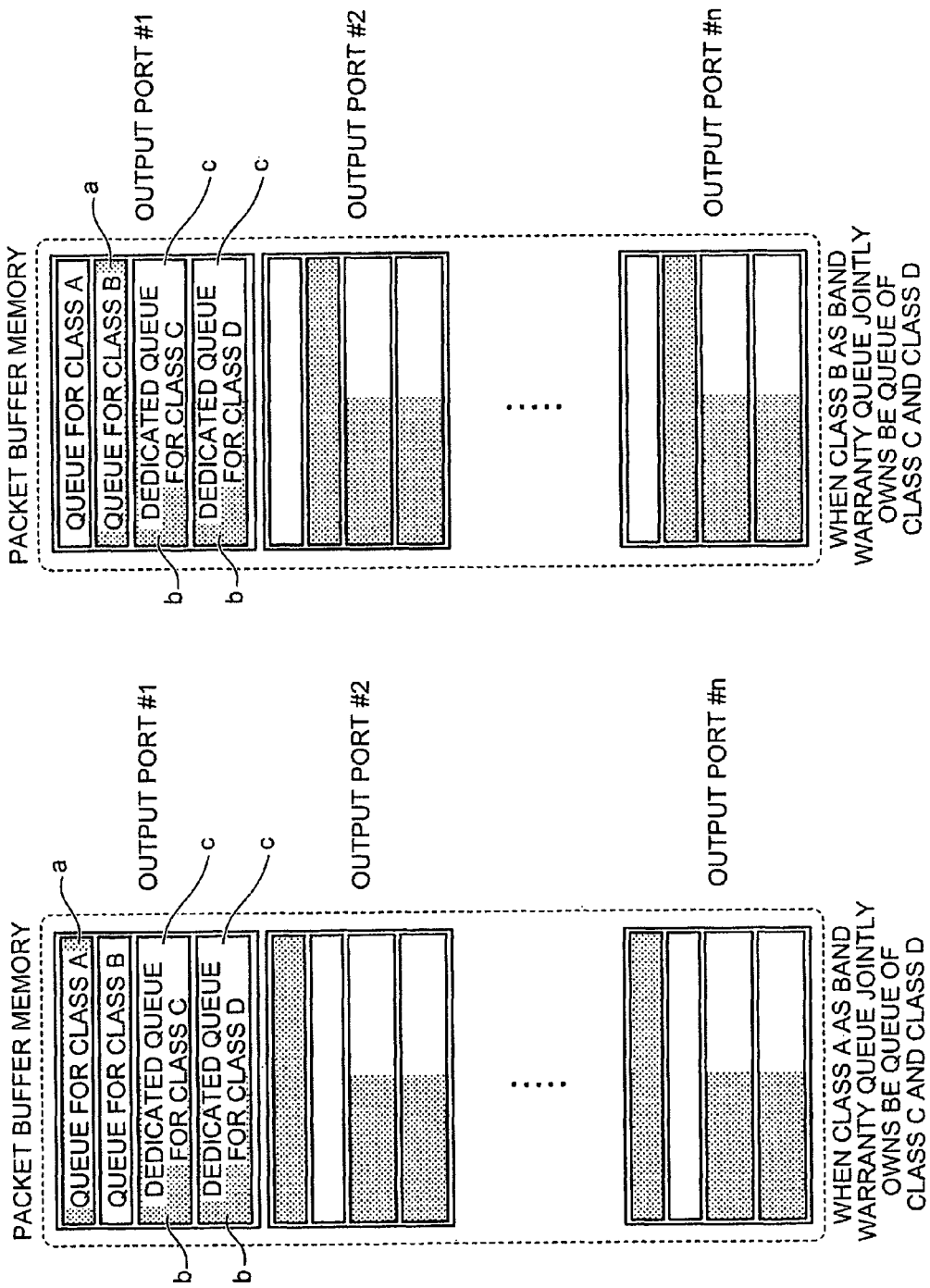

FIG.10C

| PORT | CLASS | DEDICATED SPENDING CAPACITY | CURRENT DEDICATED SPENDING CAPACITY | CURRENT DEDICATED FREE CAPACITY |
|---|---|---|---|---|
| #1 | A | 50 | 30 | 20 |
| #1 | B | 50 | 0 | 0 |
| #1 | C | 25 | 0 | 0 |
| #1 | D | 25 | 0 | 0 |
| | | | | |

FIG.10D

| PORT | CLASS | JOINTLY OWNED SPENDING CAPACITY | CURRENT JOINTLY OWNED SPENDING CAPACITY | CURRENT JOINTLY OWNED FREE CAPACITY |
|---|---|---|---|---|
| #1 | A,B,C | 25 | 0 | 25 |
| #1 | A,B,D | 25 | 0 | 25 |
| | | | | |
| | | | | |
| | | | | |

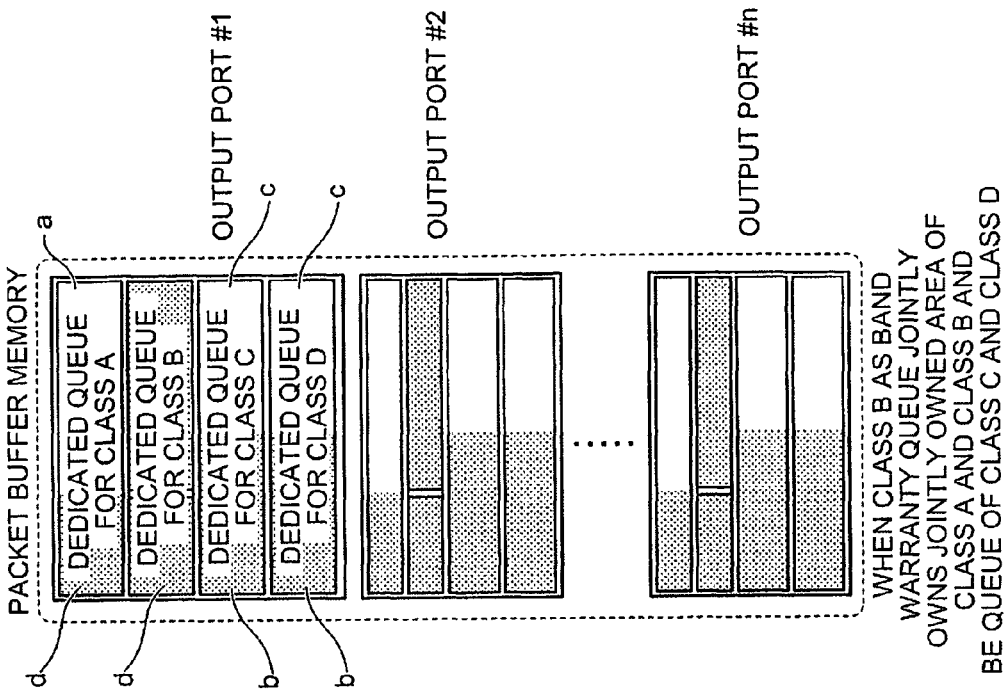
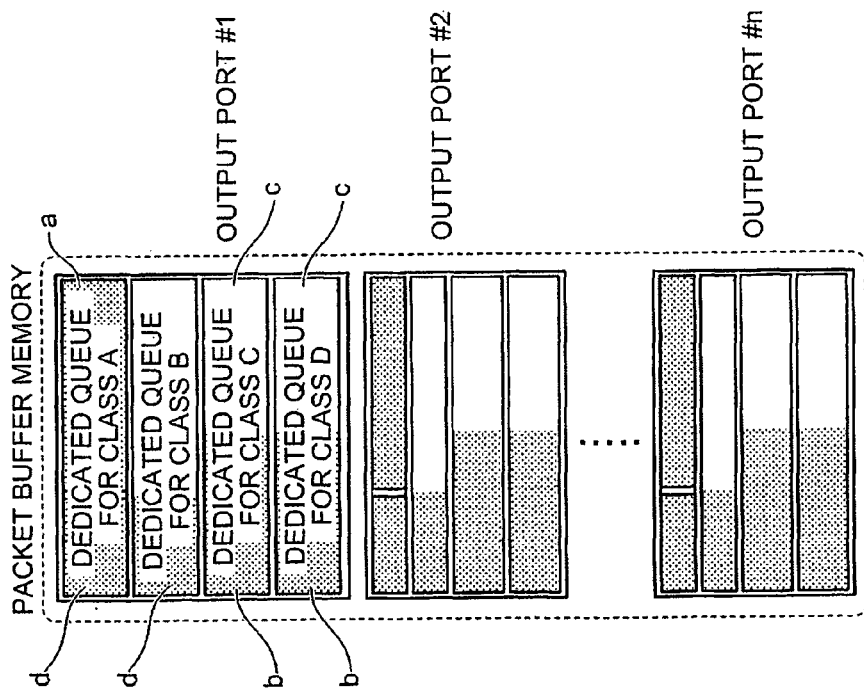

FIG.11C

| PORT | CLASS | DEDICATED SPENDING CAPACITY | CURRENT DEDICATED SPENDING CAPACITY | CURRENT DEDICATED FREE CAPACITY |
|---|---|---|---|---|
| #1 | A | 30 | 10 | 20 |
| #1 | B | 30 | 0 | 0 |
| #1 | C | 25 | 0 | 0 |
| #1 | D | 25 | 0 | 0 |
| | | | | |

FIG.11D

| PORT | CLASS | JOINTLY OWNED SPENDING CAPACITY | CURRENT JOINTLY OWNED SPENDING CAPACITY | CURRENT JOINTLY OWNED FREE CAPACITY |
|---|---|---|---|---|
| #1 | A,B | 40 | 0 | 0 |
| #1 | A,B,C | 25 | 0 | 25 |
| #1 | A,B,D | 25 | 0 | 25 |
| | | | | |
| | | | | |

FIG.12A

| PORT | CLASS | LOCATION INFORMATION (EARLY←ORDER→LATE) | | | | |
|---|---|---|---|---|---|---|
| #1 | A | 001 | 005 | 009 | | |
| #1 | B | | | | | |
| #1 | C | | | | | |
| #1 | D | | | | | |
| #2 | A | | | | | |
| #2 | B | 007 | 004 | 008 | | |
| | | | | | | |

FIG.12B

| PORT | CLASS | DEDICATED SPENDING CAPACITY | CURRENT DEDICATED SPENDING CAPACITY | CURRENT DEDICATED FREE CAPACITY |
|---|---|---|---|---|
| #1 | A | 20 | 10 | 10 |
| #1 | B | 20 | 0 | 0 |
| #1 | C | 15 | 0 | 0 |
| #1 | D | 15 | 0 | 0 |
| #2 | A | 20 | 10 | 0 |
| #2 | B | 20 | 0 | 0 |
| | | | | |

FIG.12C

| PORT | CLASS | JOINTLY OWNED SPENDING CAPACITY | CURRENT JOINTLY OWNED SPENDING CAPACITY | CURRENT JOINTLY OWNED FREE CAPACITY |
|---|---|---|---|---|
| #1 | A,B | 30 | 0 | 0 |
| #1 | A,B,C | 15 | 0 | 25 |
| #1 | A,B,D | 15 | 0 | 25 |
| #1, #2 | A,B | 10 | 0 | 0 |
| #1, #2 | A,B,C | 10 | 0 | 0 |
| | | | | |
| | | | | |

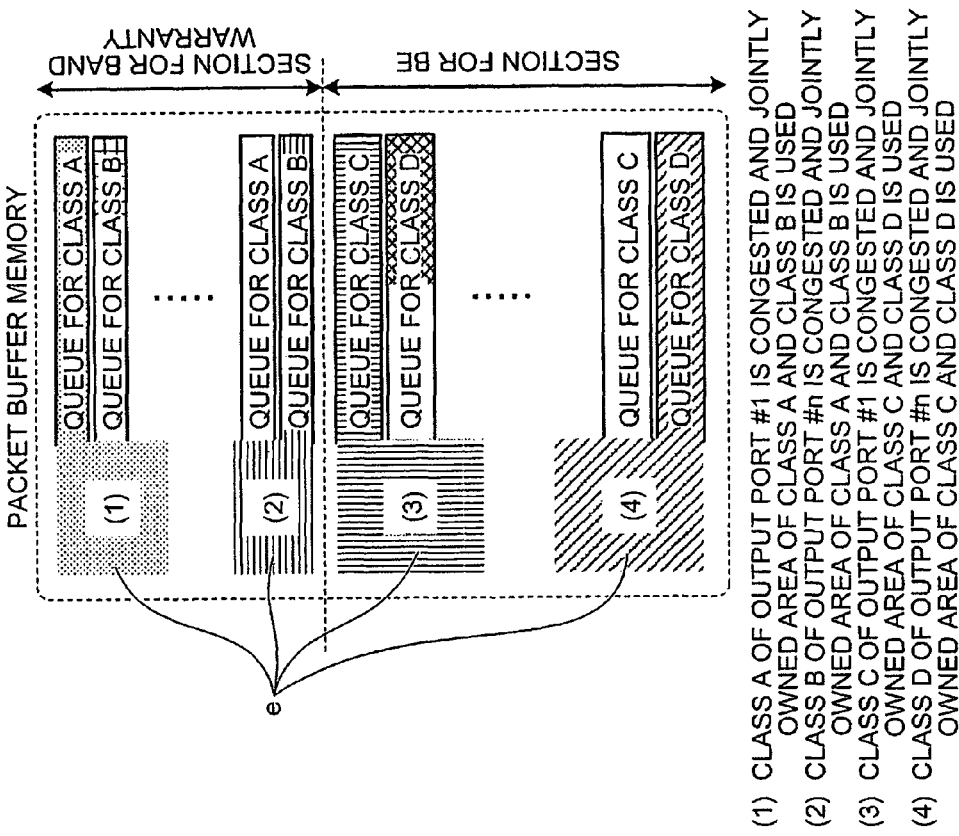
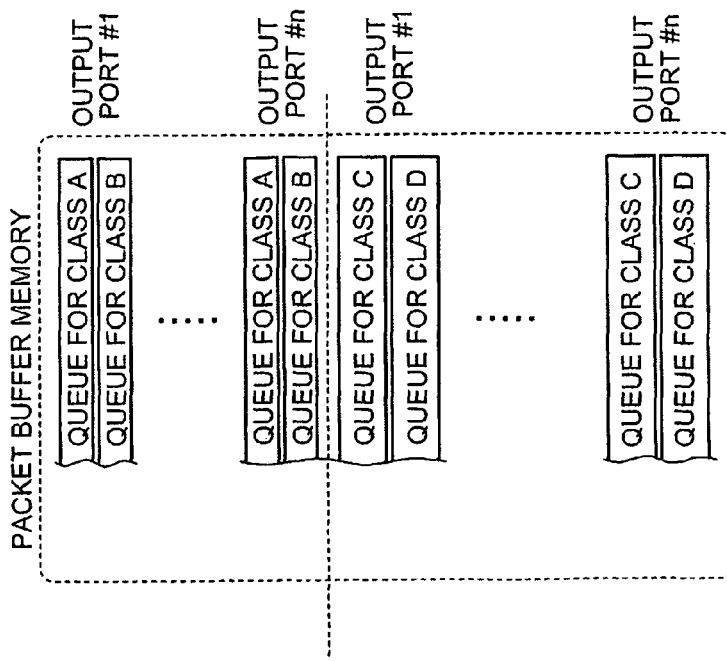

QUEUE CONFIGURATION
WHEN THERE ARE PLURAL PRIORITIES
(4 AS EXAMPLE) (CONFIGURATION
OF ONE OUTPUT PORT IS ILLUSTRATED)

PRIORITY OF CLASS: A>B>C>D

PACKET BUFFER QUEUE
CONFIGURATION WHEN THERE
IS NO PRIORITY (ONE PRIORITY)

QUEUE CONFIGURATION

EACH QUEUE ABOVE IS EXPRESSED BY OUTPUT PORT UNIT AND REPRESENTS Σ(CLASS A TO CLASS D), ETC

EACH QUEUE ABOVE IS EXPRESSED BY OUTPUT PORT UNIT AND REPRESENTS Σ(CLASS A TO CLASS D), etc.

PACKET FORWARDING APPARATUS AND CONTROLLING METHOD

CROSS-REFERENCE TO RELATED APPLICATIONS

This application is based upon and claims the benefit of priority of the prior Japanese Patent Application No. 2008-003694, filed on Jan. 10, 2008, the entire contents of which are incorporated herein by reference.

BACKGROUND

1. Field

The present invention relates to a packet forwarding apparatus, and a controlling method.

2. Description of the Related Art

Conventionally, a packet forwarding apparatus handling an Ethernet (registered trademark) packet represented by an L2 switch or an L2 router is required to provide a warranty called QoS (Quality of Service).

Specifically, the packet forwarding apparatus performs a congestion control by a burst resistance and priority processing by using a packet buffer in a network of a 1:1 or N:1 connection. For example, the packet forwarding apparatus, equipped with a packet buffer for storing a received packet, identifies a priority (class) of the received packet and stores it into the packet buffer according to the priority (class). The packet forwarding apparatus transmits the packet of a higher priority (class) in preference and transmits the packet of a lower priority (class) over a residual band left by transmitting the packet of the higher priority (class) (generally called a best effort).

The packet forwarding apparatus stores the packet of the higher priority in preference in the packet buffer. For this reason, at the time of storing the received packet in the packet buffer, when the packet buffer has little space for storage, the packet forwarding apparatus discards the packet of the lower priority without storing it in the packet buffer.

Various technologies have been developed for such QoS. For example, Japanese Patent Application Laid-open Publication No. 2005-12431 (pages 1 to 5, FIG. 1) discloses the technology of impartially distributing the packet buffer set for the best effort for a plurality of flows. Namely, the packet forwarding apparatus according to Japanese Patent Application Laid-open Publication No. 2005-12431 stores the packets in excess of a band warranty in the packet buffer set for the best effort. Here, in the case of existence of a plurality of flows, the packet forwarding apparatus according to Japanese Patent Application Laid-open Publication No. 2005-12431 impartially distributes capacity of queue for the best effort among the plurality of flows, irrespective of magnitude of respective data volumes of the plurality of flows and stores the packets.

For example, Japanese Patent Application Laid-open Publication No. 2005-244417 (pages 1 and 5 (in particular, paragraph numbers [0026], etc.), FIG. 4) discloses the technology of assigning the band assigned for the band warranty to the band for the best effort, using the token. Namely, the packet forwarding apparatus of Japanese Patent Application Laid-open No. 2005-244417 monitors an unspent token volume at each point in time and determines whether there is any unspent token at the time of adding a next token to a token packet and if it is determined that the unspent token is left, assigns the band assigned for the band warranty to the band for the best effort, using the token.

Incidentally, the above conventional technologies had the problem of not being capable of decreasing opportunity of discarded packets while using the buffer efficiently or of maintaining the band control based on the class (packet transmission processing by the priority control based on the class).

SUMMARY

According to an aspect of an embodiment, a packet forwarding apparatus, upon receipt of a packet pre-classified with respect to a priority control, stores the packet in a buffer and then transmits it based on the priority control. The packet forwarding apparatus includes a location information storing unit that, with respect to the packets currently stored in the buffer, stores, by the class, order information indicating the order in which the packet has been received and location information specifying at which location of the buffer the received packet is stored, in correspondence therewith; a packet transmitting unit that selects a predetermined class according to the priority control, reads out the packet stored foremost corresponding to the selected class out of the packets currently stored in the buffer from the buffer, using the order information and the location information stored in the location information storing unit, and transmits it; a dedicated capacity storing unit that stores, by the class, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith; a jointly owned capacity storing unit that stores, by combination of plural classes, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith; a class identifying unit that identifies the class of the received packet; a dedicated capacity spending unit that reads out the dedicated free capacity corresponding to the class identified by the class identifying unit from the dedicated capacity storing unit, determines whether there is the capacity for storing the received packet and, if it is determined that there is the capacity for storing the packet, stores the packet in the buffer, treating the dedicated free capacity of the class as having been spent; a jointly owned capacity spending unit that, if it is determined by the dedicated capacity spending unit that there is no capacity for storing the received packet, reads out the jointly owned free capacity corresponding to the class of the packet from the jointly owned capacity storing unit, determines whether there is the capacity for storing the packet, and, if it is determined that there is the capacity for storing the packet, stores the packet in the buffer, treating the jointly owned free capacity of the class as having been spent; and a discarding unit that, if it is determined by the jointly owned spending unit that there is no capacity for storing the received packet, discards the packet without storing it in the buffer.

According to another aspect of an embodiment, a method is for controlling a packet forwarding apparatus that, upon receipt of a packet pre-classified with respect to a priority control, stores the packet in a buffer and then transmits it based on the priority control. The method includes with respect to the packets currently stored in the buffer, storing, by the class, in a location information table, order information indicating the order in which the packet has been received and location information specifying at which location of the buffer the received packet is stored, in correspondence therewith; selecting a predetermined class according to the priority control; reading out the packet stored foremost corresponding to the selected class out of the packets currently stored in the buffer from the buffer, using the order information and the location information stored in the location information storing unit; transmitting the packet read out; storing, by the class, in a dedicated table, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith; storing, by combination of plural classes, in a jointly owned table, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith; identifying the class of the received packet; reading out the dedicated free capacity corresponding to the identified class from the dedicated table, determines whether there is the capacity for storing the received packet and, if it is determined that there is the capacity for storing the packet, stores the packet in the buffer, treating the dedicated free capacity of the class as having been spent; reading out, if it is determined by the dedicated capacity spending unit that there is no capacity for storing the received packet, the jointly owned free capacity corresponding to the class of the packet from the jointly owned table; determining whether there is the capacity for storing the packet, and, if it is determined that there is the capacity for storing the packet, storing the packet in the buffer to treat the jointly owned free capacity of the class as having been spent; and discarding, if it is determined that there is no capacity for storing the received packet, the packet without storing it in the buffer.

According to still another aspect of an embodiment, a computer program product causes a computer to perform the method according to the present invention.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIGS. 6A and 6B are charts for description of the capacity management table in the first embodiment;

FIG. 7 is a flow chart for description of a flow of the packet storing processing by the packet forwarding apparatus according to the first embodiment;

FIGS. 9A and 9B are diagrams for description of the technique of distributing in the first embodiment;

FIGS. 10A and 10B are diagrams for description of the technique of distributing in the second embodiment;

FIGS. 10C and 10D are diagrams for description of the technique of distributing in the second embodiment;

FIGS. 11A and 11B are diagrams for description of the technique of distributing in the second embodiment;

FIGS. 11C and 11D are diagrams for description of the technique of distributing in the second embodiment;

FIGS. 12A to 12C are diagrams for description of the technique of distributing in the second embodiment;

FIGS. 12D and 12E are diagrams for description of the technique of distributing in the second embodiment;

DETAILED DESCRIPTION OF THE PREFERRED EMBODIMENTS

Detailed description will now be made of exemplary embodiments of a packet forwarding apparatus, a control method, and a packet forwarding program, with reference to accompanying drawings. In the following, description will be made of main terms (description of terms), an outline and characteristics of the packet forwarding apparatus according to the present embodiments, a configuration of the packet forwarding apparatus, and a flow of processing, in such order and at last, description will be made of variations of the present embodiments.

First of all, description will be made of main terms used in the present embodiments. "Packet forwarding apparatus" as used in the present embodiments is an apparatus that, upon receipt of a packet pre-classified in respect of a priority control, stores the packet in a buffer 10 and then transmit the packet based on the priority control and specifically, an Ethernet (registered trademark) packet handling apparatus represented by an L2 switch or an L3 router corresponds to the packet forwarding apparatus.

"Priority control" as used in the present embodiments is to perform a control of identifying a class (priority) of the packet in a band warranty by a QoS (Quality of Service: for example, performing a congestion control in a network of 1:1 or N:1 connection), storing the packet in the buffer 10 or discarding it, based on the class, and reading out the packet from the buffer 10 and transmitting it.

Figure 1:
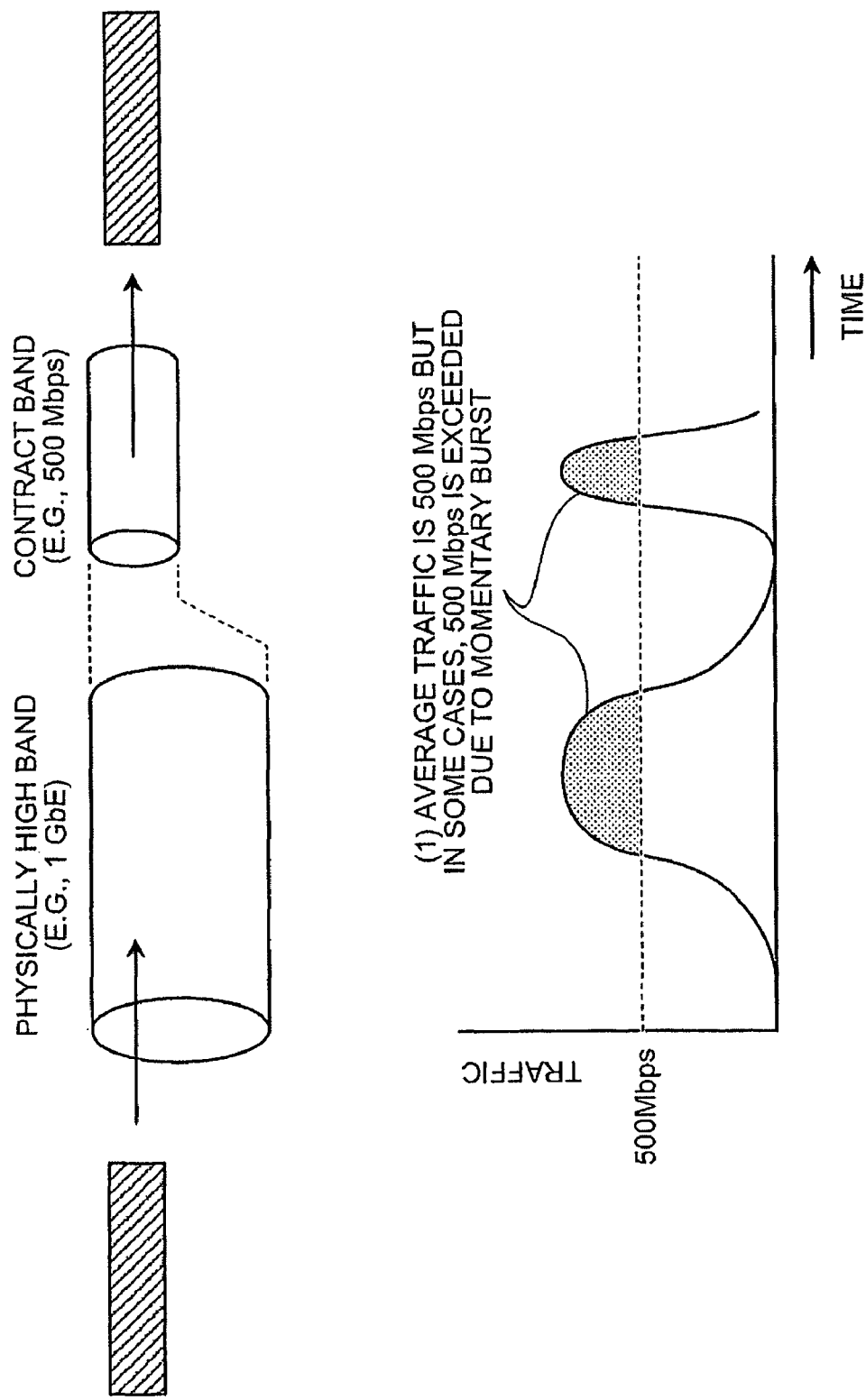
FIG. 1 is a drawing for description of the terms.

As shown, for example, in FIG. 1, even when average traffic is below a contract band (500 Mbps in the example shown in FIG. 1), a situation happens in which an actual band is in excess of the contract band (for example, 500 Mbps) due to a temporary burst, etc., as shown in (1) of FIG. 1. Such situation of exceeding the contract band conspicuously arises in particular when the packets received from N number of ports are collected to one port. The reason is that there is such manner of use that the situation of more input rates flowing in than the contract band continues to happen. For this reason, conventionally, the packet apparatus, by holding the buffer 10 with a view to preventing the situation in which the packets in excess of the contract band are discarded, has a burst resistance and performs the priority control. FIG. 1 is a drawing for description of the terms.

Specifically, conventional packet forwarding apparatus identifies the class of each packet, transmits or receives the packet of a higher class (higher priority) in preference, and transmits or receives the packet of a lower class (lower priority) over a residual band left after transmission or reception of the packet of the higher class (higher priority).

When the discard of the packets is not performed, the buffer 10 is required to have the capacity exceeding the contract band shown in (1) of FIG. 1 and furthermore, in the case of the packet forwarding apparatus provided with a plurality of ports, is required to have the capacity equal to such plurality of ports ((capacity exceeding the contract band shown in (1) of FIG. 1)×(number of output ports)). In contrast, the conventional packet forwarding apparatus has the buffer 10 whose actual capacity is below such capacity (the capacity that the buffer 10 is required to have) because of a cost and a packaging space and discards the packet of the lower class (lower priority) when the remaining capacity of the packet buffer 10 is low.

"Class" as used in the present embodiments is the one set for each packet and the class comprises the class for the band warranty used in the packet communication in which the band is warranted and the class for the best effort used in the packet communication in which the band is not warranted. Here, generally, the packet of the class for the band warranty is the packet not permitted to be discarded and the packet of the class for the best effort is the packet that, not being band-warranted, is permitted to be discarded.

Figure 2:
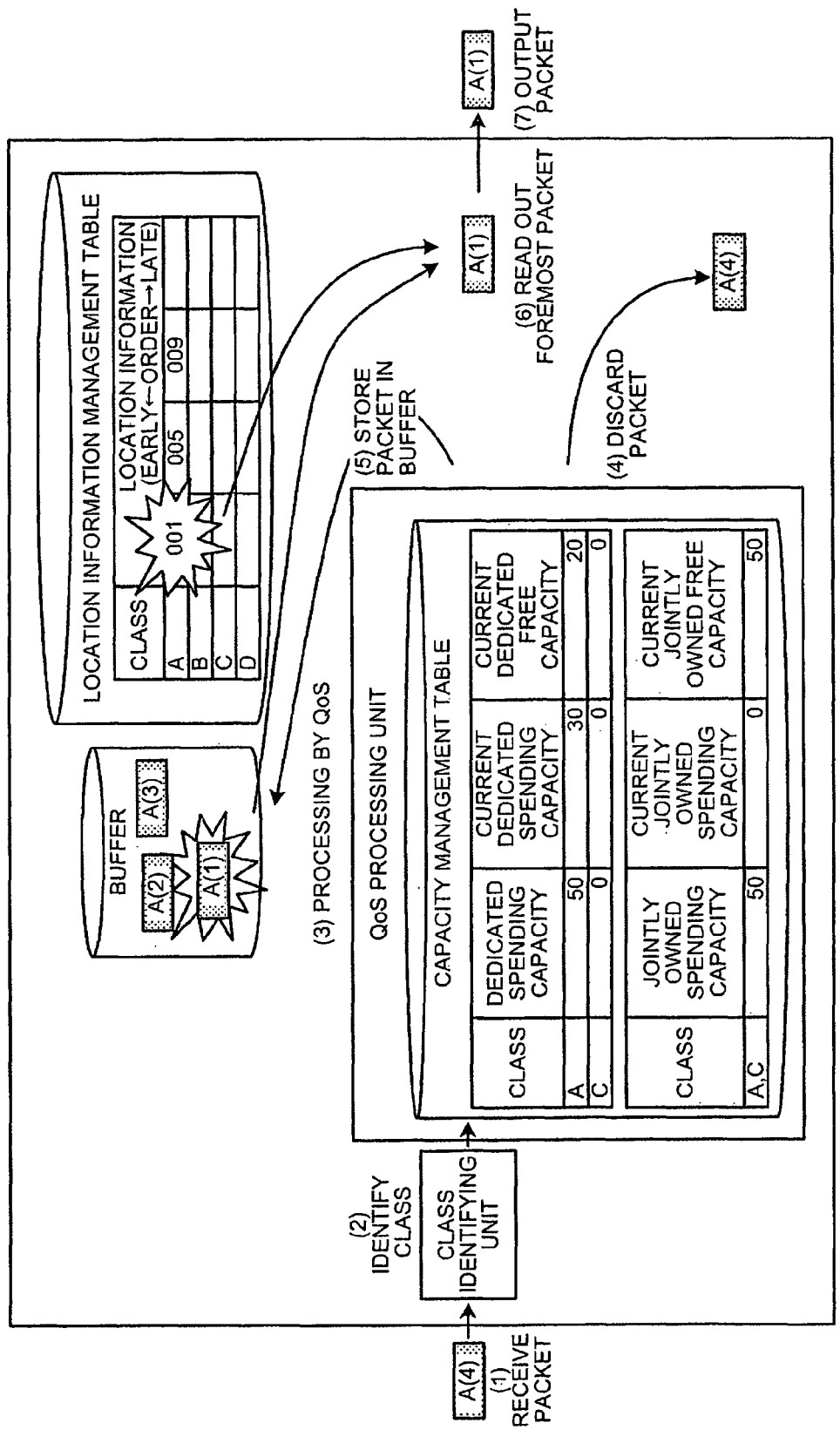
FIG. 2 is a diagram for description of the outline and the characteristics of the packet forwarding apparatus according to a first embodiment.

First of all, description will be made of the outline and the characteristics of the packet forwarding apparatus according to the present embodiments, with reference to FIG. 2. FIG. 2 is a diagram for description of the outline and the characteristics of the packet forwarding apparatus according to a first embodiment. With respect to the description of the packet forwarding apparatus given below, description will be made with classes "A" and "B" as the class for the band warranty and classes "C" and "D" as the class for the best effort, unless otherwise indicated.

As shown in FIG. 2, the packet forwarding apparatus according to the first embodiment is summarized as an apparatus that, upon receipt of the packet pre-classified in respect of the priority control, stores the packet in the buffer 10 and then transmits the packet based on the priority control and is characterized mainly in decreasing the opportunity of the discarded packets while efficiently using the buffer 10 and maintaining the band control based on the class (packet transmitting processing by the priority control based on the class), as described below.

To describe this main characteristic, the packet forwarding apparatus according to the first embodiment, as shown in a location information management table of FIG. 2, stores, by the class, order information indicating the order in which the packet has been received and location information specifying at which location of the buffer 10 the received packet is stored, in correspondence therewith, with respect to the packets currently stored in the buffer 10. For example, in an example shown in the location information management table of FIG. 2, the packet forwarding apparatus according to the first embodiment stores, in correspondence with class A, the location information "001", "005", and "009" in the order in which such pieces of information are stored in the buffer 10.

The packet forwarding apparatus according to the first embodiment stores, by the class, a dedicated spending capacity indicating the capacity that only the packets of an applicable class are permitted to spend, out of the capacity of the buffer 10, a current dedicated spending capacity indicating the capacity currently spent out of the dedicated spending capacity, and a dedicated free capacity obtained by subtracting the current dedicated spending capacity from the dedicated spending capacity, in correspondence therewith. The packet forwarding apparatus according to the first embodiment stores, by combination of plural classes, a jointly owned spending capacity indicating the capacity that packets of plural classes are permitted to jointly own and spend, out of the capacity of the buffer 10, a current jointly owed spending capacity indicating the capacity currently spent out of the jointly owned spending capacity, and a jointly owned free capacity obtained by subtracting the current jointly owned spending capacity from the jointly owned spending capacity, in correspondence therewith.

For example, the packet forwarding apparatus according to the first embodiment, in the example shown in the capacity management table of FIG. 2, stores, in correspondence with class "A", the dedicated spending capacity "50", the current dedicated spending capacity "30", and the current dedicated free capacity "20" by the capacity management table and stores, in correspondence with class "C", the dedicated spending capacity "0", the current dedicated spending capacity "0", and the current dedicated free capacity "0", by the capacity management table. The packet forwarding apparatus according to the first embodiment stores, in correspondence with class "A,C", the jointly owned spending capacity "50", the current jointly owned spending capacity "0", and the current jointly owned free capacity "50" by the capacity management table.

In such configuration, firstly, the packet forwarding apparatus according to the first embodiment identifies the class of the received packet. For example, the packet forwarding apparatus according to the first embodiment, upon receipt of the packet as shown in (1) of FIG. 2, identifies the class of the received packet, for example, as class "A", as shown in (2) of FIG. 2.

Then, the packet forwarding apparatus according to the first embodiment performs processing by the QoS as shown in (3) of FIG. 2 and discards the received packet as shown in (4) of FIG. 2 or stores the received packet in the buffer 10 as shown in (5) of FIG. 2.

Specifically, the packet forwarding apparatus according to the first embodiment firstly reads out the dedicated free capacity corresponding to the class identified by a class identifying processing unit 60 from the capacity management table, determines whether there is the capacity for storing the received packet and, if it is determined that there is the capacity for storing the packet, stores the packet in the buffer 10, treating the dedicated free capacity of the class as having been spent.

For example, the packet forwarding apparatus according to the first embodiment, upon receipt of the packet of class "A", reads out the current dedicated free capacity "20" corresponding to class "A". Here, when the capacity of the received packet is equal to or less than "20" (for example, "10"), the packet forwarding apparatus according to the first embodiment stores the packet in the buffer 10, treating the current dedicated free capacity of class "A" as having been spent and updates the current dedicated spending capacity corresponding to class "A" from "30" to "40" and the current dedicated free capacity from "20" to "10".

Thereafter, if it is determined that the dedicated free capacity has no capacity for storing the received packet, the packet forwarding apparatus according to the first embodiment reads out the jointly owned free capacity corresponding to the class of the packet from the capacity management table, determines whether there is the capacity for storing the packet and, if it is determined that there is the capacity for storing the packet, stores the packet in the buffer 10, treating the jointly owned free capacity as having been spent.

For example, upon receipt of the packet of class "A" and if it is determined that the current dedicated free capacity has no sufficient capacity, the packet forwarding apparatus according to the first embodiment reads out the current jointly owned free capacity "50" corresponding to class "A". Here, if the capacity of the received packet is equal to or less than "50" (for example, "30"), the packet forwarding apparatus according to the first embodiment stores the packet in the buffer 10, treating the jointly owned free capacity of class A as having been spent, and updates the current jointly owned spending capacity corresponding to class "A" from "0" to "30" and the jointly owned free capacity from "50" to "20".

Then, if it is determined that the jointly owned free capacity has no capacity for storing the received packet, the packet forwarding apparatus according to the first embodiment discards the packet without storing it in the buffer 10. For example, upon receipt of the packet of class "A" (for example, packet of capacity "60"), if it is determined that the current dedicated free capacity has no sufficient capacity, and if it is determined that the current jointly owned free capacity has no sufficient capacity, the packet forwarding apparatus according to the first embodiment discards the packet.

Then, as shown in (6) and (7) of FIG. 2, the packet forwarding apparatus according to the first embodiment selects a predetermined class according to the priority control and, using the order information and the location information stored in the location information management table, reads out the foremost stored packet corresponding to the selected class out of the packets currently stored in the buffer 10 and transmits it. For example, the packet forwarding apparatus according to the first embodiment reads out the packet corresponding to the location information "001" of the foremost packet (packet stored in the buffer 10 earliest) in class A as the class for the band warranty from the buffer 10 as shown in (6) of FIG. 2 and transmits the packet as shown in (7) of FIG. 2.

As seen from the above, the packet forwarding apparatus according to the first embodiment is capable of decreasing the opportunity of the discarded packets while efficiently using the buffer 10 and maintaining the band warranty based on the class (packet transmission and reception by the priority control based on the class), as is the above main characteristic.

Figure 3:
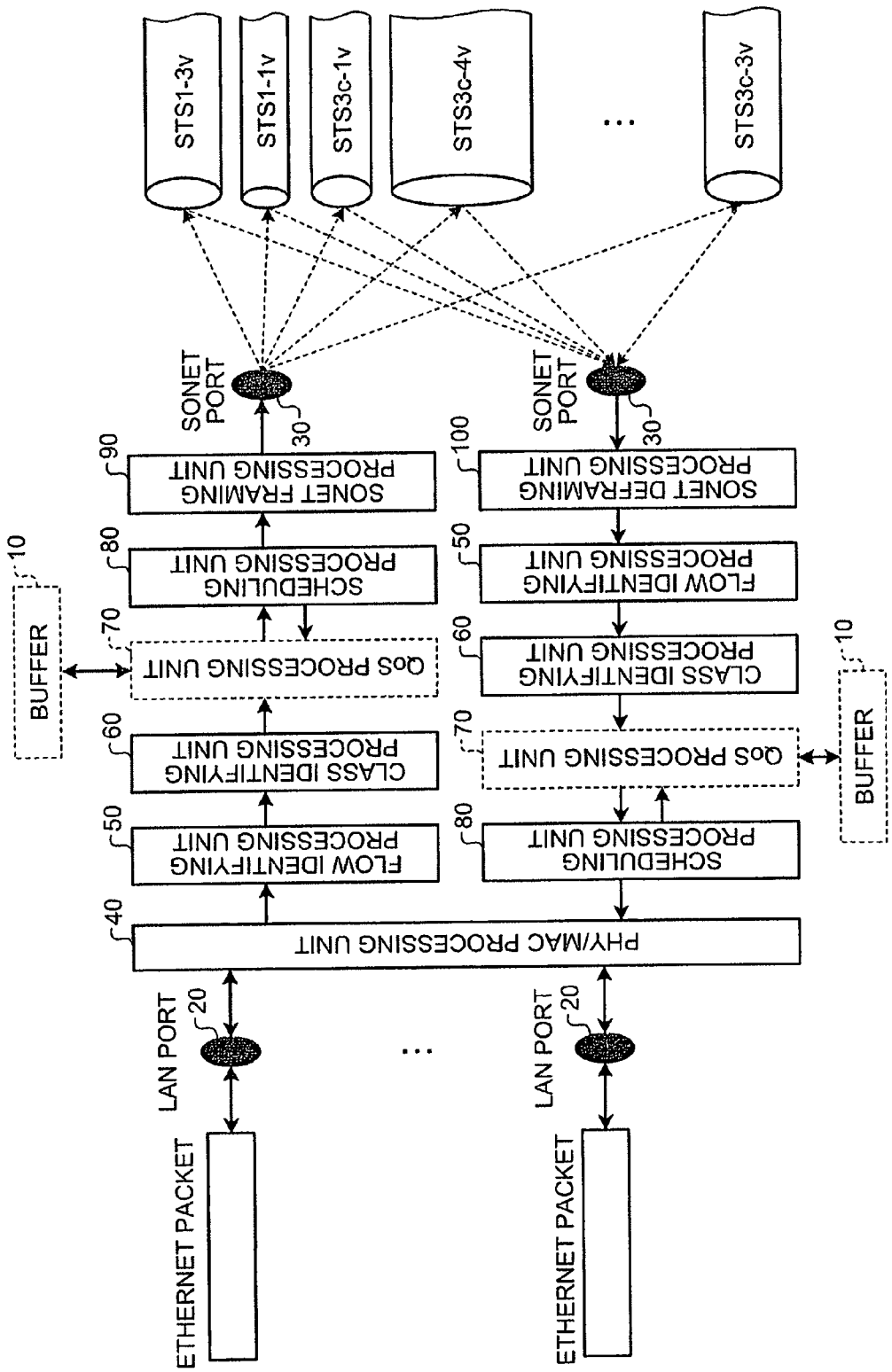
FIG. 3 is a block diagram of the configuration of the entire packet forwarding apparatus in the first embodiment.

Description will then be made of the configuration of the packet forwarding apparatus shown in FIG. 2, using FIG. 3. In the following, description will be made of the packet forwarding apparatus that performs collection of a LAN line to a SONET line (outputting data received from the LAN line to the SONET line) and performs the collection of the SONET line to the LAN line (outputting the data received from the SONET line to the LAN line). FIG. 3 is a block diagram of the configuration of the entire packet forwarding apparatus in the first embodiment.

This packet forwarding apparatus has the buffer 10 and comprises a LAN port 20, a PHY/MAC processing unit 40, a flow identifying processing unit 50, a class identifying processing unit 60, a QoS processing unit 70, a scheduling processing unit 80, a SONET framing processing unit 90, a SONET deframing processing unit 100, and a SONET port 30. The class identifying processing unit 60 and the flow identifying processing unit 50 correspond to a "class identifying unit" described in the scope of claims and the scheduling processing unit 80 and a buffer storage pointer processing unit 140 to be described later correspond to a "packet transmitting unit" described in the scope of claims.

While, in the first embodiment, description will be made of the packet forwarding apparatus between the LAN line and the SONET line (namely, performing the collection of the LAN line to the SONET line and performing the collection of the SONET line to the LAN line), the present invention is not limited to this but may be between the LAN line and the LAN line or between the SONET line and the SONET line.

In the following description, since processing of outputting the packet received from the LAN line through the SONET line and the processing of outputting a frame received from the SONET line to the LAN line are almost the same, description will be made of only the case of outputting the packet received from the LAN line to the SONET line, unless otherwise indicated.

The buffer 10 temporarily stores the packet received by the packet forwarding apparatus. Specifically, the buffer 10 stores the packet received by the packet forwarding apparatus until the packet is read out and transmitted. For example, the buffer 10 stores the received packet and, when the packet is read out and transmitted, deletes the packet and stores other received packet in a free area.

The LAN port 20 receives the Ethernet (registered trademark) packet and transmits the Ethernet (registered trademark) packet. Specifically, the packet forwarding apparatus receives the Ethernet (registered trademark) packet from the LAN line by way of the LAN port 20 and transmits the Ethernet (registered trademark) packet to the LAN line (a destination terminal as a destination connected to the LAN line or the destination terminal by way of the LAN line) by way of the LAN port 20.

The SONET port 30 receives a SONET frame and transmits the SONET frame. Specifically, the packet forwarding apparatus receives the SONET frame from the SONET line by way of the SONET port 30 and transmits the SONET frame to the SONET line (the destination terminal as the destination connected to the SONET line or the destination terminal by way of the SONET line) by way of the SONET port 30.

The PHY/MAC processing unit 40, upon input of the Ethernet (registered trademark) packet from the LAN side, performs physical layer processing and MAC terminating processing of the packet and transmits the packet to the flow identifying processing unit 50.

The flow identifying processing unit 50 identifies the port. Specifically, the flow identifying processing unit 50 identifies to which output port the received packet is to be output, with respect to each received packet. For example, the flow identifying processing unit 50 identifies the port with respect to each received packet and if the received packet is addressed to the output port "#1", identifies the port as "#1".

The class identifying processing unit 60 identifies the class with respect to the received packet. Specifically, for example, the class identifying processing unit 60 identifies the class with respect to each received packet and, if the class of the received packet is "A" of the class for the band warranty, identifies the class as "A" of the class for the band warranty.

The QoS processing unit 70 stores the received packet in the buffer 10 and reads out the packet stored in the buffer 10. Specifically, the QoS processing unit 70, based on the class identified by the class identifying processing unit 60, stores the received packet in the buffer 10 or discards the packet. The QoS processing unit 70, based on an instruction from the scheduling processing unit 80 to be described later, reads out the packet stored in the buffer 10. The QoS processing unit 70 is one of characteristic parts of the embodiment and details of the QoS will be described later using FIG. 4.

The scheduling processing unit 80 selects a predetermined class according to the priority control and gives the instruction to read out the packet stored foremost corresponding to the selected class out of the packets currently stored in the buffer 10.

Specifically, the scheduling processing unit 80, depending on the band assigned in the SONET line to which the packet is output, determines the port and the class of the packet to be transmitted and transmits the port and the class to the QoS processing unit 70. Then, the scheduling processing unit 80 transmits the packet transmitted from the QoS processing unit 70 to the SONET framing processing unit 90.

For example, the scheduling processing unit 80, if it selects "A" as the predetermined class according to the priority control, transmits the instruction to read out the foremost packet in class A to the QoS processing unit 70 (the buffer storage pointer processing unit 140 to be described later) and transmits the packet read out by the QoS processing unit 70 to the SONET framing processing unit 90 to be described later.

The SONET framing processing unit 90 maps the packet to be transmitted to a SONET frame format and then outputs it to the SONET line.

The SONET deframing processing unit 100, if it receives a frame from the SONET line, releases the SONET frame format and changes it to the format in which the transmission and reception is performed over the LAN line.

Since in the SONET, communication band may be changed dynamically (STS band may be changed to A6 or may be removed) by the technology called LCAS (Link Capacity Adjustment Scheme), the band control to accommodate these is now required.

Figure 4:
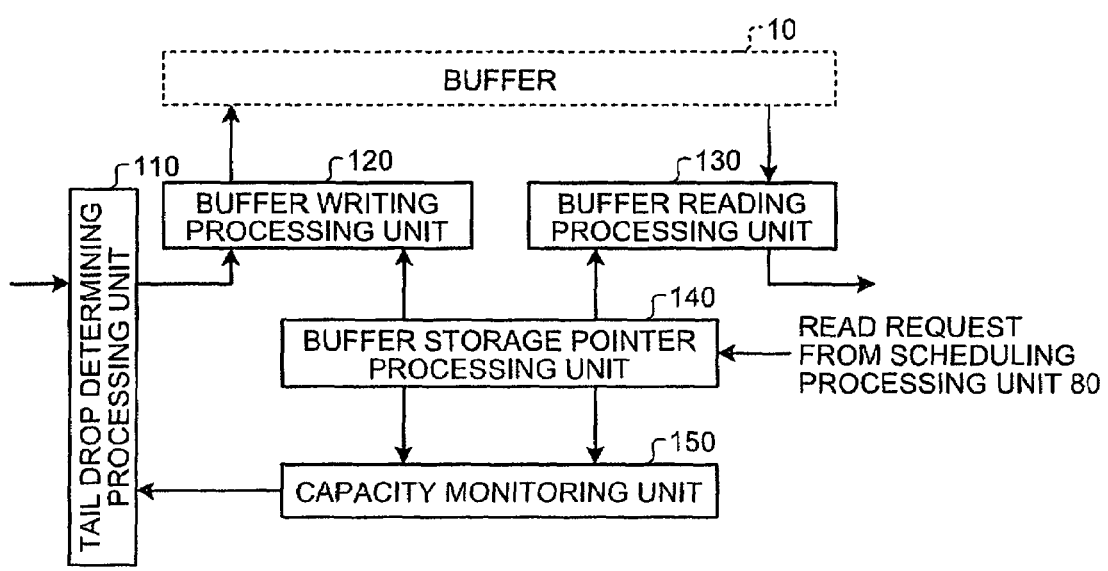
FIG. 4 is a block diagram of the configuration of the QoS processing unit 70 in the first embodiment.

Description will then be made of a detailed configuration of the QoS processing unit 70, using FIGS. 4 to 6. FIG. 4 is a block diagram of the configuration of the QoS processing unit 70 in the first embodiment; FIG. 5 is a diagram for description of the buffer storage pointer processing unit 140 in the first embodiment; and FIGS. 6A and 6B are charts for description of the capacity management table in the first embodiment.

As shown in FIG. 4, the QoS processing unit 70 comprises the buffer storage pointer processing unit 140, a buffer writing processing unit 120, a buffer reading processing unit 130, a Tail Drop determining processing unit 110, and a capacity monitoring unit 150. Here, the buffer storage pointer processing unit 140 connects with the buffer writing processing unit 120, the buffer reading processing unit 130, the capacity monitoring unit 150, and the scheduling processing unit 80 (see FIG. 3), the Tail Drop determining processing unit 110 connects with the class identifying processing unit 60, the buffer writing processing unit 120, and the capacity monitoring unit 150, the buffer writing processing unit 120 connects with the buffer 10 and the buffer storage pointer processing unit 140, the buffer reading processing unit 130 connects with the buffer 10 and the buffer storage pointer processing unit 140, and the capacity monitoring unit 150 connects with the Tail Drop determining processing unit 110 and the buffer storage pointer processing unit 140.

The Tail Drop determining processing unit 110 corresponds to a "discarding unit" described in the scope of claims, the location information management table of the buffer storage pointer processing unit 140 corresponds to a "location information storing unit" described in the scope of claims, the capacity management table of the buffer storage pointer processing unit 140 corresponds to a "dedicated capacity storing unit" and a "jointly owned capacity storing unit", and the capacity monitoring unit 150 corresponds to a "dedicated capacity spending unit" and a "jointly owned capacity spending unit" described in the scope of claims.

The Tail Drop determining processing unit 110 determines whether the free capacity in the capacity of the buffer as a whole has a sufficient free capacity to store the received packet. Specifically, if the free capacity in the capacity of the buffer as a whole has no sufficient free capacity to store the received packet, the Tail Drop determining processing unit 110 determines to discard the received packet. For example, the Tail Drop determining processing unit 110, upon receipt of the packet by the packet forwarding apparatus, determines whether there is a sufficient free capacity to store the packet (unused capacity in the total capacity of the buffer) by obtaining the information from the capacity monitoring unit 150 to be described later. Here, if there is the sufficient free capacity to store the packet (and if no instruction to discard the packet is received from the capacity monitoring unit 150 to be described later), the Tail Drop determining processing unit 110 transmits the packet to the buffer writing processing unit 120. On the other hand, if there is no sufficient free capacity to store the packet, the Tail Drop determining processing unit 110 discards the packet.

If it is determined by the capacity monitoring unit 150 to be described later that there is no capacity to store the received packet, the Tail Drop determining processing unit 110 discards the packet without storing it in the buffer 10. For example, upon receipt of the instruction to discard the received packet from the capacity monitoring unit 150 to be described later, the Tail Drop determining processing unit 110 discards the packet and upon receipt of the instruction to store the received packet in the buffer 10 without discarding it, the Tail Drop determining processing unit 110 transmits the packet to the buffer writing processing unit 120 to be described later.

The buffer writing processing unit 120 writes the received packet to the buffer 10 and transmits the location information specifying the packet to the buffer storage pointer processing unit 140. Specifically, the buffer writing processing unit 120, according to the location information notified by the buffer storage pointer processing unit 140 to be described later, stores the packet at the location in the buffer 10 specified by the location information.

The buffer reading processing unit 130 reads out the packet to be output from the buffer 10 and transmits it to the scheduling processing unit 80. Specifically, the buffer reading processing unit 130, upon acquisition of the location information from the buffer storage pointer processing unit 140, reads out the packet at the location in the buffer 10 specified by the location information and transmits it to the scheduling processing unit 80.

The buffer storage pointer processing unit 140, with respect to the packets currently stored in the buffer 10, stores, by the class, the order information indicating the order in which the packet is received, and the location information specifying at which location of the buffer 10 the received packet is stored, in correspondence therewith and, with respect to the packets currently stored in the buffer 10 out of the received packets, manages the information required in transmitting the packets.

Figures 5A, 5B:
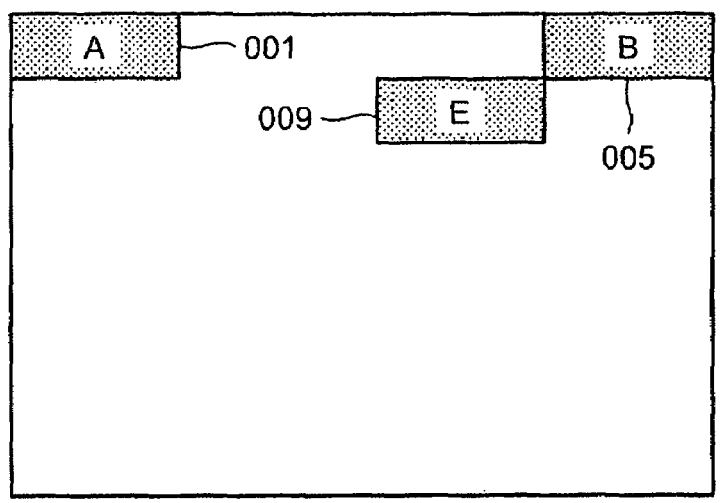
FIG. 5 is a diagram for description of the buffer storage pointer processing unit in the first embodiment.

FIG. 5A exemplifies the packets stored in the buffer; and FIG. 5B exemplifies the location information management table. For example, as shown in FIGS. 5A and 5B, the buffer storage pointer processing unit 140 manages, with respect to the packets currently stored in the buffer 10 out of the received packets, the location information specifying the location in the buffer 10 at which the packets are stored, by the location information management table. The buffer storage pointer processing unit 140 manages, with respect to the packets currently stored in the buffer 10 out of the received packets, in relation to the corresponding class out of respective classes set for the output port corresponding to the packet, a relative order among packets stored in relation to the class (the order in which the packets are received by the packet forwarding apparatus), by the location information management table. In the example shown in FIG. 5B, the buffer storage pointer processing unit 140 stores, with respect to the packets currently stored in the buffer 10, the "location information" in the order in which the packets are received, in correspondence with the "port" that uniquely identifies the port and the "class" that uniquely identifies the class, in the location information management table. To explain by giving a specific example, in the example shown in FIG. 5B, the location information "001", "005", and "009" is stored in correspondence with port "#1" class "A".

Each time the packet forwarding apparatus receives the packet, the buffer storage pointer processing unit 140 notifies the buffer writing processing unit 120 of appropriate location information and at the same time, stores such location information by the location information management table and stores the order of the packet by the location information management table. Description will be made of storing of the location information and the order information in the management table, giving example of the case in which the packet forwarding apparatus receives the packet A and stores it in the buffer 10, receives the packet B and stores it in the buffer 10, and receives the packet E and stores it in the buffer 10. For example, when the packet forwarding apparatus stores the packet A at the location in the buffer 10 specified by the location information "001" as shown in FIG. 5A, the buffer storage pointer processing unit 140 stores the location information "001", in correspondence with port "#1" class "A", in the location information management table as shown in FIG. 5B. Thereafter, when the packet forwarding apparatus stores the packet B at the location in the buffer 10 specified by the location information "005" as shown in FIG. 5A, the buffer storage pointer processing unit 140 stores the location information "005" next to the location information "001", in correspondence with port "#1" class "A", in the location information management table as shown in FIG. 5B.

Each time the packet is read out from the buffer 10, the buffer storage pointer processing unit 140 updates the location information management table. Specifically, the buffer storage pointer processing unit 140 deletes the location information corresponding to the read-out packet from the location information management table and updates the relative order in the class corresponding to the packet by the location information management table. For example, in the example shown in FIG. 5B, when the packet A specified by the location information "001" is transmitted, the buffer storage pointer processing unit 140 deletes the location information "001". In other words, in the example shown in FIG. 5B, the buffer storage pointer processing unit 140, as a result of deletion of the location information "001", stores the order of the packet specified by the location information "005" as the earliest and the order of the packet specified by the location information "009" as the second earliest.

The buffer storage pointer processing unit 140, according to the instruction from the scheduling processing unit 80 (instruction as to the class selected by the priority control), reads out the packet stored foremost corresponding to the selected class out of the packets currently stored in the buffer 10 from the buffer 10, using the order information and the location information stored in the location information management table.

Specifically, the buffer storage pointer processing unit 140, upon receipt of the port and the class of the packet to be transmitted from the scheduling processing unit 80, refers to the location information management table, selects the packet of the earliest order in the corresponding class, and transmits the corresponding location information to the buffer reading processing unit 130. Then, the buffer storage pointer processing unit 140 notifies the capacity monitoring unit 150 of the capacity, the output port, and the class of the read-out packet.

The capacity monitoring unit 150 manages by storing, by the class, the dedicated spending capacity indicating the capacity that only the packet of the class is permitted to spend out of the capacity of the buffer 10, the current dedicated spending capacity indicating the capacity currently spent out of the dedicated spending capacity, and the dedicated free capacity obtained by subtracting the current dedicated spending capacity from the dedicated spending capacity, in correspondence therewith, in the capacity management table. The capacity monitoring unit 150 also manages by storing, by combination of plural classes, the jointly owned spending capacity indicating the capacity that the packets of plural classes are permitted to jointly own and spend out of the capacity of the buffer 10, the current jointly owned spending capacity indicating the capacity currently spent out of the jointly owned spending capacity, and the jointly owned free capacity obtained by subtracting the current jointly owned spending capacity from the jointly owned spending capacity, in correspondence therewith, in the capacity management table.

Specifically, the capacity monitoring unit 150 manages by storing a positive value as the dedicated spending capacity in the capacity management table at least with respect to the class for the band warranty and manages by storing a positive value as the jointly owned spending capacity in the capacity management table with respect to the combination of classes for the band warranty and the best effort.

For example, as shown in FIGS. 6A and 6B, the capacity monitoring unit 150 manages by storing the "dedicated spending capacity", the "current dedicated spending capacity", and the "current dedicated free capacity" in the capacity management table, in relation to the corresponding class out of respective classes set in the output port corresponding to the packet and also manages by storing the "jointly owned spending capacity", the "current jointly owned spending capacity", and the "current jointly owned free capacity" in the capacity management table, in relation to the corresponding class out of respective classes set in the output port corresponding to the packet. To describe by giving a specific example, the capacity monitoring unit 150 manages by storing, in correspondence with port "#1" class "A", the dedicated spending capacity "50", the current dedicated spending capacity "30", and the current dedicated free capacity "20" in the capacity management table. The capacity monitoring unit 150 also manages by storing, in correspondence with port "#1" class "A, B, C", the jointly owned spending capacity "50", the current jointly owned spending capacity "0", and the current jointly owned free capacity "50" in the capacity management table.

The capacity monitoring unit 150 grasps the current spending capacity of the buffer 10 and provides a criterion of decision-making for determining whether to store the received packet in the buffer 10, as described below. For this reason, the capacity monitoring unit 150 is a key block in realizing the embodiment.

While in the first embodiment, description is made of the technique by the capacity monitoring unit 150 of managing by storing the "dedicated spending capacity", the "jointly owned spending capacity", the "current spending capacity", and the "current free capacity" in the capacity management table, in correspondence with each class, the present invention is not limited to this but it may be so arranged that managing is performed by storing only some of the above items in the capacity management table. For example, it may be so arranged that the capacity monitoring unit 150 manages by storing the "dedicated spending capacity", the "jointly owned spending capacity", and the "current spending capacity" in the capacity management table, in correspondence with each class and that the "current free capacity" is calculated and used whenever it is necessary to do so (for example, each time the packet is received). The capacity monitoring unit 150 may also manage by storing the "current free capacity" in the capacity management table in correspondence with each class.

While in the first embodiment, description is made of the capacity monitoring unit 150's technique of managing the "dedicated spending capacity", the "jointly owned spending capacity", the "current spending capacity", and the "current free capacity" as the items to be managed, the present invention is not limited to this. For example, it may be so arranged that the capacity monitoring unit 150 will manage an "actual capacity" indicating the capacity (actual capacity) of the buffer 10 as a whole, a "band-warranty-use section threshold" as the capacity to be used only by the classes for the band warranty (the capacity of the buffer not to be spent by the packet of the class for the best effort), a "dedicated area capacity" indicating the capacity of the dedicated area set for each class (each class set in the output port), the "current spending capacity" indicating the capacity currently spent for each class, a "jointly owned area free capacity" indicating the free capacity (unspent capacity) out of the capacity owned and used jointly by plural classes, a "best-effort-use free capacity" indicating the free capacity (unspent capacity) out of the capacity owned and used jointly by the classes for the best effort, and a "remaining capacity" indicating the free capacity (unspent capacity) out of the capacity of the buffer 10. Specifically, it may be so arranged that the "actual capacity", the "band-warranty-use section threshold", the "dedicated area capacity", and the "current spending capacity" will be managed by the table and that the "jointly owned area free capacity", the "best-effort-use free capacity", and the "remaining capacity" will be calculated and used (managed).

The capacity monitoring unit 150 then reads out the dedicated free capacity corresponding to the class identified by the class identifying processing unit 60 from the capacity management table, determines whether there is the capacity for storing the received packet and, if determined that there is the capacity for storing the packet, transmits the instruction to store the packet in the buffer 10 to the Tail Drop determining processing unit 110, treating the dedicated free capacity of the class as having been spent. The capacity monitoring unit 150, if determined that the current dedicated free capacity has no capacity for storing the received packet, reads out the jointly owned free capacity corresponding to the class of the packet from the capacity management table, determines whether there is the capacity for storing the packet, and, if determined that there is the capacity for storing the packet, transmits the instruction to store the packet in the buffer 10 to the Tail Drop determining processing unit 110, treating the jointly owned free capacity of the class as having been spent Specifically, the capacity monitoring unit 150, using the capacity management table, determines whether, with respect to the received packet, the corresponding dedicated spending capacity or jointly owned spending capacity has the sufficient free capacity for storing the packet in the buffer 10 and updates the value of the capacity management table when the packet is stored in the buffer 10.

To describe by giving a specific example, the capacity monitoring unit 150 determines whether the dedicated spending capacity corresponding to the class of the received packet identified by the class identifying processing unit 60 has a larger free capacity than the capacity of the received packet (determines whether there is the current dedicated free capacity). Here, if the dedicated spending capacity corresponding to the class of the packet has a remaining free capacity larger than the capacity of the received packet, the capacity monitoring unit 150 spends the dedicated spending capacity. Thereafter, when the packet is stored in the buffer 10, the capacity monitoring unit 150 updates the capacity management table.

To describe using the example shown in FIGS. 6A and 6B, since, when the capacity of the received packet is 10 (for example, port "#1" and class "A"), there is the sufficient current dedicated free capacity, the capacity monitoring unit 150 transmits the instruction to store the received packet in the buffer 10 to the Tail Drop determining processing unit 110. Then, when the buffer writing processing unit 120 stores the packet in the buffer 10 and upon notification of a spent capacity from the buffer storage pointer processing unit 140, the capacity monitoring unit 150 updates the capacity management table by reflecting the notified spent capacity on the current dedicated spending capacity and the current dedicated free capacity corresponding to the class of the received packet (for example, adding the notified spent capacity to the current dedicated spending capacity and subtracting the notified spent capacity from the current dedicated free capacity).

On the other hand, if the dedicated spending capacity corresponding to the class of the received packet does not have the remaining free capacity (if there is no current dedicated free capacity) larger than the capacity of the received packet, the capacity monitoring unit 150 determines whether the corresponding jointly owned spending capacity has the free capacity (determines whether there is the current jointly owned free capacity) larger than the capacity of the received packet. Here, if the jointly owned spending capacity corresponding to the class of the packet has the remaining free capacity larger than the capacity of the received packet, the capacity monitoring unit 150 spends the jointly owned spending capacity. Then, when the packet is stored in the buffer, the capacity monitoring unit 150 updates the capacity management table.

To describe using the example shown in FIGS. 6A and 6B, since, when the capacity of the received packet is 30, there is the sufficient current jointly owned free capacity, the capacity monitoring unit 150 transmits the instruction to store the received packet in the buffer 10 without discarding it to the Tail Drop determining processing unit 110. Then, when the buffer writing processing unit 120 stores the packet in the buffer 10 and upon notification of a spent capacity from the buffer storage pointer processing unit 140, the capacity monitoring unit 150 updates the capacity management table by reflecting the notified spent capacity on the current jointly owned spending capacity and the current jointly owned free capacity corresponding to the class of the received packet (for example, adding the notified spent capacity to the current jointly owned spending capacity and subtracting the notified spent capacity from the current jointly owned free capacity).

On the other hand, if the jointly owned spending capacity corresponding to the class of the received packet does not have the remaining free capacity larger than the capacity of the received packet (if there is no sufficient current jointly owned free capacity), the capacity monitoring unit 150 transmits the instruction to discard the packet to the Tail Drop determining processing unit 110.

Then, when the packet is read out from the buffer 10 and upon receipt of the capacity, the output port, and the class of the packet from the buffer storage pointer processing unit 140, the capacity monitoring unit 150 updates the capacity management table. In more detail, the capacity monitoring unit 150 updates by reflecting the notified packet capacity on the current dedicated spending capacity and the current dedicated free capacity, or the current jointly owned spending capacity and the current jointly owned free capacity, corresponding to the class of the received packet (for example, subtracting the notified packet capacity from the current jointly owned spending capacity and adding the notified packet capacity to the current jointly owned free capacity).

The processing performed by the capacity monitoring unit 150 when the packet is stored in the buffer 10 and the processing performed by the capacity monitoring unit 150 when the packet is read out from the buffer 10 are the processing performed independently of each other.

Description will then be made of packet storing processing by the packet forwarding apparatus, using FIG. 7. FIG. 7 is a flow chart for description of a flow of the packet storing processing by the packet forwarding apparatus according to the first embodiment.

As shown in FIG. 7, when the packet forwarding apparatus receives the packet from the LAN port 20 (step S101: Yes), the PHY/MAC processing unit 40 performs the physical layer processing and the MAC terminating processing (step S102).

The flow identifying processing unit 50 then identifies the port (step S103). For example, the flow identifying processing unit 50 identifies the port of each received packet and, in the case of the received packet being addressed to the output port "#1", identifies the port as "#1".

The class identifying processing unit 60 then identifies the class (step S104). For example, the class identifying processing unit 60 identifies the class of each received packet and, when the class of the received packet is "A" of the class for the band warranty, identifies the class as "A" of the class for the band warranty.

The Tail Drop determining processing unit 110 in the QoS processing unit 70 determines whether these is a free capacity (step S105). For example, when the packet forwarding apparatus receives the packet, the Tail Drop determining processing unit 110 acquires the information as to whether these is a sufficient free capacity for storing the packet from the capacity monitoring unit 150 to be described later.

If it is determined that there is the free capacity (step S105: Yes), then the capacity monitoring unit 150 in the QoS processing unit 70 determines whether there is the current dedicated free capacity corresponding to the class identified by the class identifying processing unit 60 (step S106). If there is the current dedicated free capacity (step S106: Yes), then the capacity monitoring unit 150 spends the dedicated sending capacity (step S107). Namely, for example, to describe using the example shown in FIGS. 6A and 6B, when the capacity of the received packet is 10 (for example, port "#1", class "A"), there is the sufficient current dedicated free capacity and therefore, the capacity monitoring unit 150 transmits the instruction to store the received packet in the buffer 10 to the Tail Drop determining processing unit 110. Then, when the buffer writing processing unit 120 stores the packet in the buffer 10 and upon notification of a spent capacity from the buffer storage pointer processing unit 140, the capacity monitoring unit 150 updates by reflecting the notified spent capacity on the current dedicated spending capacity and the current dedicated free capacity corresponding to the class of the received packet.

On the other hand, if the there is no current dedicated free capacity (step S106: No), then the capacity monitoring unit 150 in the QoS processing unit 70 determines whether there is the current jointly owned free capacity corresponding to the class identified by the class identifying processing unit 60 (step S108). If there is the current jointly owned free capacity (step S108: Yes), then the capacity monitoring unit 150 spends the jointly owned spending capacity (step S109). Namely, for example, to describe using the example shown in FIGS. 6A and 6B, when the capacity of the received packet is 30, there is the sufficient current jointly owned free capacity and therefore, the capacity monitoring unit 150 transmits the instruction to store the received packet in the buffer 10 without discarding it to the Tail Drop determining processing unit 110. Then, when the buffer writing processing unit 120 stores the packet in the buffer 10 and upon notification of a spent capacity from the buffer storage pointer processing unit 140, the capacity monitoring unit 150 updates by reflecting the notified spent capacity on the current jointly owned spending capacity and the current jointly owned free capacity corresponding to the class of the received packet.

At step S105 above, if the Tail Drop determining processing unit 110 in the QoS processing unit 70 determines that there is no sufficient free capacity (step S105: No), then the Tail Drop determining processing unit 110 discards the packet (step S110). If the Tail Drop determining processing unit 110 in the QoS processing unit 70 determines that there is no sufficient current jointly owned free capacity (step S108: No), then the Tail Drop determining processing unit 110 discards the packet (step S110). For example, when the capacity monitoring unit 150 determines that there is no sufficient current jointly owned free capacity and upon receipt of the instruction to discard the packet from the capacity monitoring unit 150, the Tail Drop determining processing unit 110 discards the packet and the processing is finished (End).

[Packet Reading-Out Processing by the Packet Repeating Apparatus]

Figure 8:
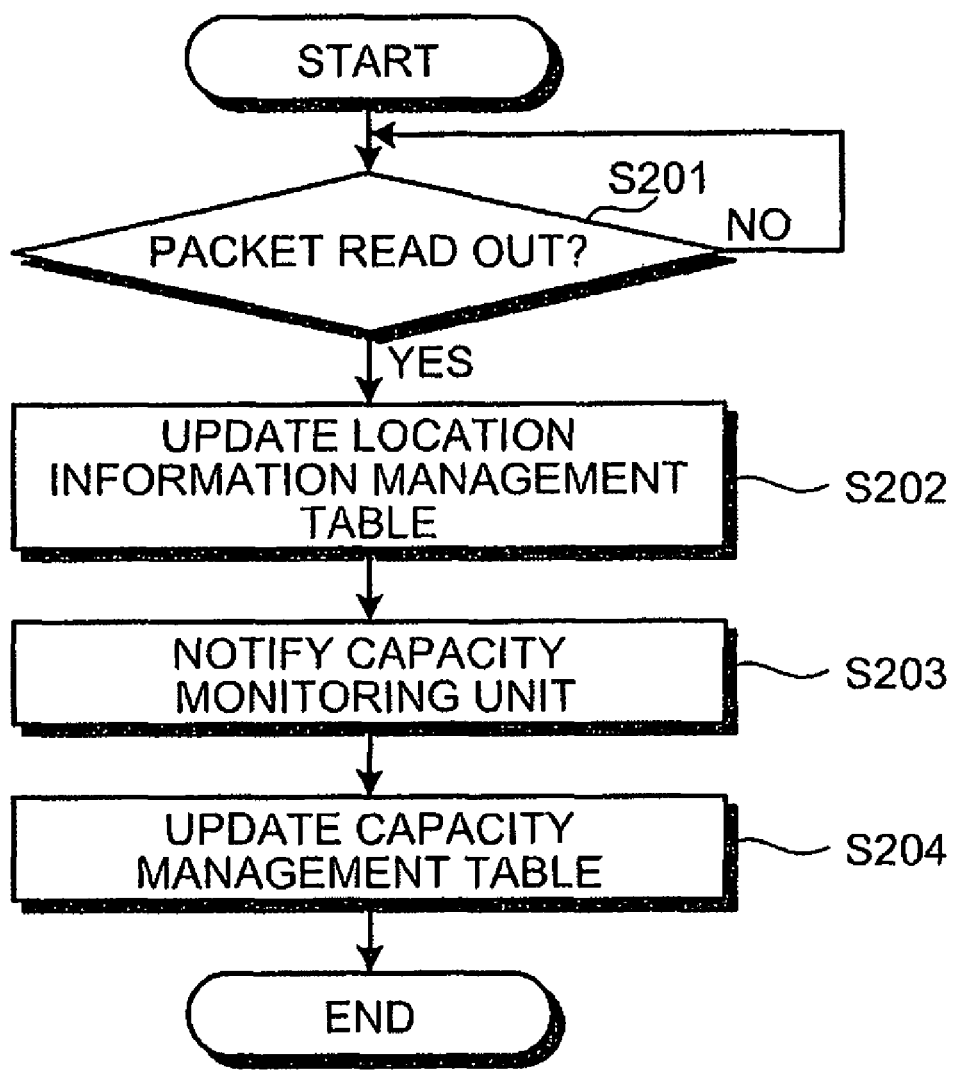
FIG. 8 is a flow chart for description of a flow of the packet reading-out processing by the packet forwarding apparatus according to the first embodiment.

Description will then be made of the packet reading-out processing by the packet forwarding apparatus, using FIG. 8. FIG. 8 is a flow chart for description of a flow of the packet reading-out processing by the packet forwarding apparatus according to the first embodiment.

As shown in FIG. 8, if there is the read-out packet (Yes, at step S201), namely, if, for example, the packet is read out from the buffer 10 and output, then the buffer storage pointer processing unit 140 updates the location information management table (step S202). For example, each time the packet is read out from the buffer 10, the buffer storage pointer processing unit 140 deletes the location information corresponding to the read-out packet from the location information management table and updates the relative order within the class corresponding to the packet by the location information management table.

The buffer storage pointer processing unit 140 then notifies the capacity monitoring unit 150 of the capacity (the free capacity increased by reading out the packet from the buffer 10), the output port, and the class of the read-out packet (step S203).

The capacity monitoring unit 150 then updates the capacity management table (step S204). For example, the capacity monitoring unit 150 updates by reflecting the notified packet capacity on the current dedicated spending capacity and the current dedicated free capacity, or the current jointly owned spending capacity and the current jointly owned free capacity, corresponding to the class of the received packet. Then, the processing is finished (End).

As described above, the first embodiment, which, with respect to packets currently stored in the buffer 10, stores, by the class, the order information and the location information in correspondence therewith, selects a predetermined class according to the priority control, reads out from the buffer 10 the packet stored foremost corresponding to the selected class out of the packets currently stored in the buffer 10 and transmits it, using the order information and the location information, stores, by the class, the dedicated spending capacity, the current dedicated spending capacity, and the current dedicated free capacity in correspondence therewith, stores, by the combination of plural classes, the jointly owned spending capacity, the current jointly owned spending capacity, and the current jointly owned free capacity in correspondence therewith, identifies the class of the received packet, reads out the dedicated free capacity corresponding to the identified class, determines whether there is the capacity for storing the received packet, stores the packet in the buffer 10, treating the dedicated free capacity as having been spent, when it is determined that there is the capacity for storing the packet, reads out the jointly owned free capacity corresponding to the class of the packet when it is determined that the current dedicated free capacity has no capacity for storing the received packet, determines whether there is the capacity for storing the packet, stores the packet in the buffer 10, treating the jointly owned free capacity of the class as having been spent when it is determined that there is the capacity for storing the packet, and discards the packet without storing it in the buffer 10 when it is determined that the current jointly owned free capacity has no capacity for storing the packet, is capable of decreasing the opportunity of the discarded packet while efficiently using the buffer 10 and at the same time, maintaining the band control based on the class (packet transmitting processing by the priority control based on the class).

The first embodiment, which stores a positive value as the dedicated spending capacity at least with respect to the class for the band warranty and stores a positive value as the jointly owned spending capacity with respect to the combination of classes for the band warranty and the best effort, is capable of improving the burst resistance by storing the packet in the buffer 10 for the best effort even if the buffer 10 for the band warranty has no free capacity any longer, with respect to the packet classified as belonging to the class for the band warranty and is capable of efficiently using the buffer 10 without increasing the buffer 10 for the band warranty. Furthermore, the first embodiment is also capable of maintaining the band control based on the class (the packet transmitting processing by the priority control based on the class).

In the first embodiment, as shown in FIGS. 9A and 9B, description has been made of the case of setting the jointly owned spending capacity that the packet of the class for the band warranty and the packet of the class for the best effort jointly own and spend, as a technique of distributing the capacity of the buffer 10. For example, upon receipt of the packet whose class is "A", the packet forwarding apparatus according to the first embodiment stores it in the buffer 10, spending the dedicated spending capacity set for class "A" (a of FIGS. 9A and 9B), as shown in (1) of FIGS. 9A and 9B and, if the dedicated spending capacity has no sufficient free capacity, stores it in the buffer 10, spending the jointly owned spending capacity jointly owned by class "A", class "B", and class "C" (b of FIG. 9), as shown in (2) of FIGS. 9A and 9B. FIGS. 9A and 9B are diagrams for description of the technique of distributing the buffer 10 in the first embodiment.

However, the present invention is not limited to this but may take various distributing techniques. Accordingly, in the following, description will be made of various techniques of distributing the capacity of the buffer 10, as a second embodiment, using FIGS. 10 to 16. FIGS. 10 to 16 are diagrams for description of the technique of distributing the buffer 10 in the second embodiment. As described above, with respect to the following description of the packet forwarding apparatus as well, description will be made treating class "A" and class "B" as the class for the band warranty and class "C" and class "D" as the class for the best effort, unless otherwise indicated.

(1) Setting Dedicated Spending Capacity for Class for Best Effort

For example, the packet forwarding apparatus according to the second embodiment may store a positive value as the dedicated spending capacity with respect to the class for the best effort. For example, as shown in FIGS. 10A and 10B, the packet forwarding apparatus according to the second embodiment provides the dedicated spending capacity for the class for the best effort (c of FIGS. 10A and 10B). In more detail, in the example shown in FIGS. 10C and 10D, the packet forwarding apparatus according to the second embodiment stores and manages by the capacity management table the dedicated spending capacity "50" in correspondence with port "#1", class "A" and class "B" and stores and manages by the capacity management table the dedicated spending capacity "25" in correspondence with port "#1", class "C" and class "D".

By distributing the buffer 10 in such a manner, the packet forwarding apparatus according to the second embodiment is capable of preventing entire discard of the packet of the class for the best effort. For example, even if the packet of the class for the band warranty has spent all of the capacity to be jointly owned and spent by the class for the band warranty and the class for the best effort, the packet forwarding apparatus according to the second embodiment is capable of preventing a situation of entirely discarding the packet by setting the capacity that is not the capacity owned jointly with the class for the band warranty, namely, by setting a positive value as the dedicated spending capacity for the class for the best effort.

(2) Setting Jointly Owned Spending Capacity Jointly Owned Only by Classes for Band Warranty For example, when there are plural classes at least with respect to the class for the band warranty, the packet forwarding apparatus according to the second embodiment may store a positive value as the jointly owned spending capacity with respect to a combination of classes for the band warranty. For example, when the positive value is stored as the jointly owned spending capacity with respect to the combination of classes for the band warranty, the packet forwarding apparatus according to the second embodiment may store the positive value as the dedicated spending capacity with respect to each of the classes for the band warranty.

For example, as shown in FIGS. 11A and 11B, the packet forwarding apparatus according to the second embodiment provides the jointly owned spending capacity to be jointly owned and spent by the packet of class "A" and the packet of class "B" (d of FIGS. 11A and 11B). Then, the packet forwarding apparatus according to the second embodiment provides the dedicated spending capacity (a of FIGS. 11A and 11B) with respect to class "A" and class "B" for which the jointly owned spending capacity is provided. In more detail, as shown in FIGS. 11C and 11D, the packet forwarding apparatus according to the second embodiment stores and manages by the capacity management table the dedicated spending capacity "30" in correspondence with port "#1", class "A", stores and manages by the capacity management table the dedicated spending capacity "30" in correspondence with port "#1", class "B", and stores and manages by the capacity management table the jointly owned spending capacity "40" in correspondence with port "#1", class "A, B".

When the positive value is stored as the jointly owned spending capacity with respect to the combination of the classes for the band warranty, the present invention is not limited to the case in which the packet forwarding apparatus according to the second embodiment stores the positive value as the dedicated spending capacity with respect to each of the classes for the band warranty or is not limited to the case in which the packet forwarding apparatus according to the second embodiment stores the positive value as the dedicated spending capacity only with respect to some of the classes, or the packet forwarding apparatus according to the second embodiment is not necessarily required to store the positive value as the dedicated spending capacity with respect to any class.

By distributing the buffer 10 in such a manner, the packet forwarding apparatus according to the second embodiment is capable of efficiently using the buffer 10 as compared with the technique of not jointly owning the capacity among the classes for the band warranty (having an exclusive relationship).

For example, when there are classes "A" and "B" as the class for the band warranty and classes "C" and "D" as the class for the best effort and when the dedicated spending capacity provided for A comes to have no free capacity, by spending the jointly owned spending capacity owned jointly with class "B" as the class for the band warranty rather than immediately spending the jointly owned spending capacity owned jointly with the class for the best effort, the packet forwarding apparatus according to the second embodiment is capable of decreasing the capacity of the packet overflowing the jointly owned spending capacity owned jointly with the class for the best effort and as a result, reducing the jointly owned spending capacity owned jointly with the class for the best effort (reducing the overall capacity of the buffer 10), thereby efficiently using the buffer 10.

For example, the packet forwarding apparatus according to the second embodiment, which stores the positive value as the dedicated spending capacity with respect to the class for the band warranty, is also capable of preventing the entire discard of the class for the band warranty at the time of setting the jointly owned spending capacity with respect to the combination of the classes for the band warranty.

For example, even if the packet of one class for the band warranty has spent all the capacity to be owned and spent jointly with the other class for the band warranty, the packet forwarding apparatus according to the second embodiment is capable of preventing the entire discard of the packet of the other class for the band warranty by setting the capacity that is not the jointly owned capacity for the class for the band warranty.

(3) Dedicated Spending Capacity Set for Class for Band Warranty

For example, the packet forwarding apparatus according to the second embodiment is not limited to the case of setting the dedicated spending capacity with respect to all of the classes for the band warranty but may set the dedicated spending capacity with respect to only some of the classes.

(4) Jointly Owned Spending Capacity Set between Classes of Different Ports

For example, while the above embodiments did not refer to the case in which the packet forwarding apparatus according to the second embodiment has plural ports, the present invention is not limited to this but the packet forwarding apparatus according to the second embodiment may have the plural ports.

Specifically, the packet forwarding apparatus according to the second embodiment is designed to have the plural ports and manages by storing, by the port and by the class, the order information and the location information in correspondence therewith, in the location information management table, as shown in FIG. 12A. In more detail, in the example shown in FIG. 12A, the packet forwarding apparatus according to the second embodiment stores and manages, in correspondence with port "#1" class "A", the location information "005" next to the location information "001" and stores and manages, in correspondence with port "#2" class "B", the location information "004" next to the location information "007".

As shown in FIG. 12B, the packet forwarding apparatus according to the second embodiment manages by storing in the capacity management table, by the port and by the class, the dedicated spending capacity, the current dedicated spending capacity, and/or the dedicated free capacity in correspondence therewith. In more detail, the packet forwarding apparatus according to the second embodiment, in the example shown in FIG. 12B, manages by storing in the capacity management table the dedicated spending capacity "20" in correspondence with port "#1" class "A" and manages by storing in the capacity management table the dedicated spending capacity "20" in correspondence with port "#2" class "A".

The packet forwarding apparatus according to the second embodiment, as shown in FIG. 12C, may store, with respect to the combination of classes between different ports, the jointly owned spending capacity, the current jointly owned spending capacity, and the jointly owned free capacity in correspondence therewith. In such a case, the packet forwarding apparatus according to the second embodiment stores the positive value as the jointly owned spending capacity with respect to the combination of plural classes for the band warranty between the different ports and stores the positive value as the jointly owned spending capacity with respect to the combination of the class for the band warranty and the class for the best effort between the different ports.

For example, the packet forwarding apparatus according to the second embodiment may provide the jointly owned spending capacity jointly owned and spent by class "A,B" regarding port "#1 and #2" (e of FIG. 12E). In more detail, the packet forwarding apparatus according to the second embodiment, in the example shown in FIG. 12C, manages by storing in the capacity management table the jointly owned spending capacity "10" in correspondence with port "#1, #2" class "A, B" and manages by storing in the capacity management table the jointly owned spending capacity "10" in correspondence with port "#1, #2" class "A,B,C".

The packet forwarding apparatus according to the second embodiment (the capacity monitoring unit 150) reads out the dedicated free capacity corresponding to the identified port and class from the capacity management table, determines whether there is the capacity for storing the received packet and, if it is determined that there is the capacity for storing the packet, stores the packet in the buffer 10, treating the dedicated free capacity corresponding to the port and the class as having been spent.

Then, if it is determined that the current dedicated free capacity has no capacity for storing the received packet, the packet forwarding apparatus according to the second embodiment (the capacity monitoring unit 150) reads out the jointly owned free capacity corresponding to the port and the class of the packet from the capacity management table, determines whether there is the capacity for storing the packet, and, if it is determined that there is the capacity for storing the packet, stores the packet in the buffer 10, treating the jointly owned free capacity corresponding to the port and the class as having been spent.

Then, at the time of transmitting the packet stored in the buffer 10, the packet forwarding apparatus according to the second embodiment selects predetermined port and class according to the priority control, reads out the packet stored foremost corresponding to the selected port and class from the buffer 10, and transmits it.

The present invention is not limited to the case in which the packet forwarding apparatus according to the second embodiment stores the positive value as the jointly owned spending capacity with respect to the combination of plural classes for the band warranty between different ports and stores the positive value as the jointly owned spending capacity with respect to the combination of the class for the band warranty and the class for the best effort between the different ports. For example, the packet forwarding apparatus according to the second embodiment may store the positive value as the jointly owned spending capacity only with respect to the combination of plural classes for the band warranty between the different ports or may store the positive value as the jointly owned spending capacity only with respect to the combination of the class for the band warranty and the class for the best effort between the different ports.

As seen above, the packet forwarding apparatus according to the second embodiment is capable of efficiently using the buffer 10 as compared with the technique of not taking into consideration the effect of congestion variations between the output ports.

Figure 13:
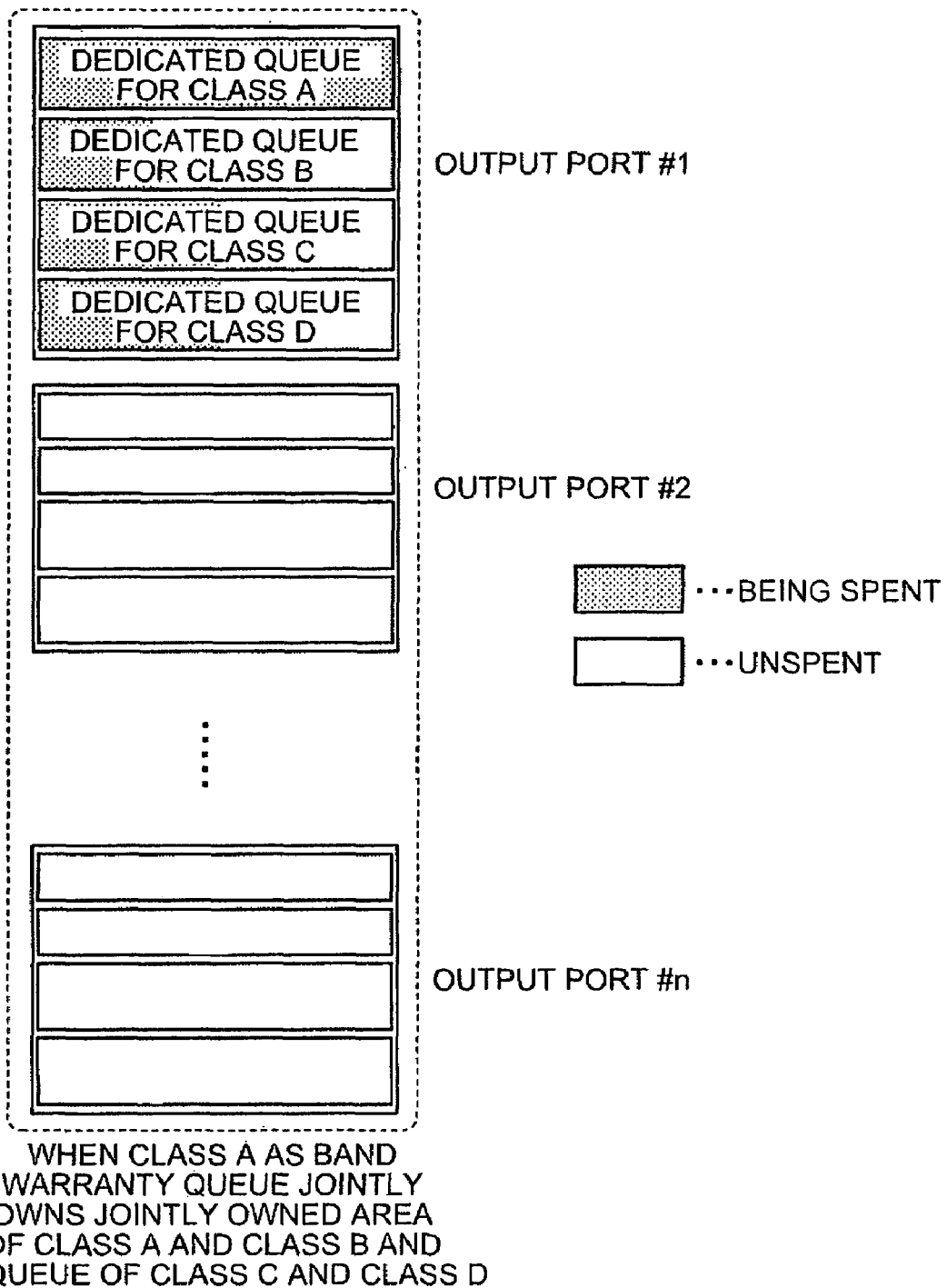
FIG. 13 is a diagram for description of the technique of distributing in the second embodiment.

For example, it is rare that the packet forwarding apparatus according to the second embodiment, as a packet forwarding apparatus with plural output ports set, has congestion of the same capacity at the same time at plural ports. In more detail, as shown in FIG. 13, there is a case in which port #1 has the congestion, while the other ports have no traffic at all. The reason is that the time of occurrence of a back pressure due to the congestion or reception of a pause frame is not the same at all ports. As a result, by jointly owning the capacity of the buffer 10, by the output port, the packet forwarding apparatus according to the second embodiment is capable of efficiently using the buffer 10.

The packet forwarding apparatus according to the second embodiment, which stores the positive value as the jointly owned spending capacity with respect to the combination of plural classes for the band warranty between different ports and stores the positive value as the jointly owned spending capacity with respect to the combination of the class for the band warranty and the class for the best effort between the different ports, is capable of avoiding the occurrence of the congestion of the class for the band warranty by the congestion of the class for the best effort and preventing reduction of congestion resistance of the class for the band warranty.

Figure 14A:
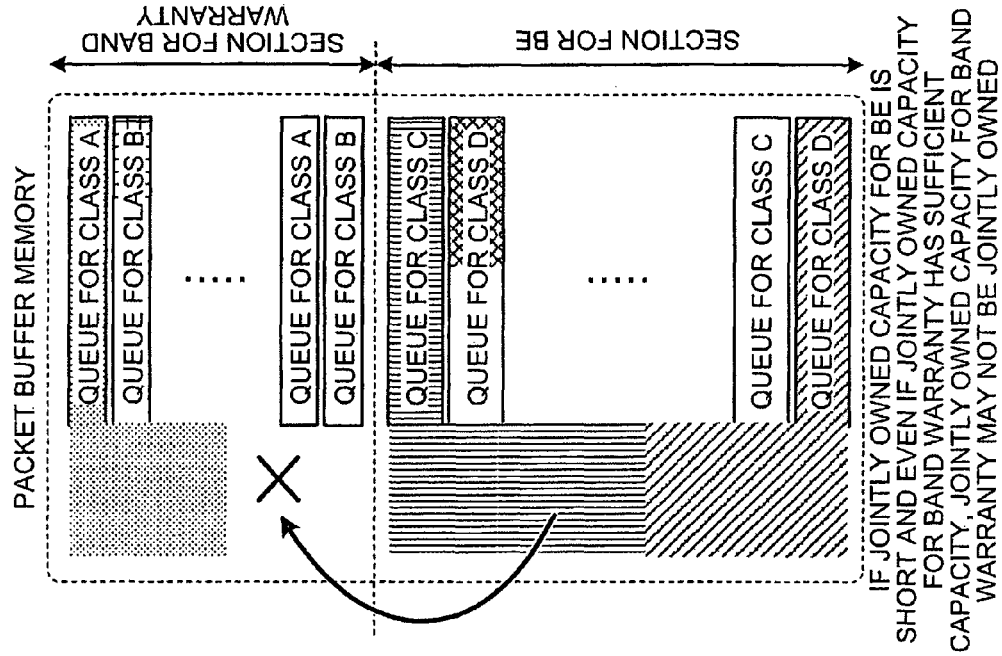
FIGS. 14A and 14B are diagrams for description of the technique of distributing in the second embodiment.
Figure 14B:
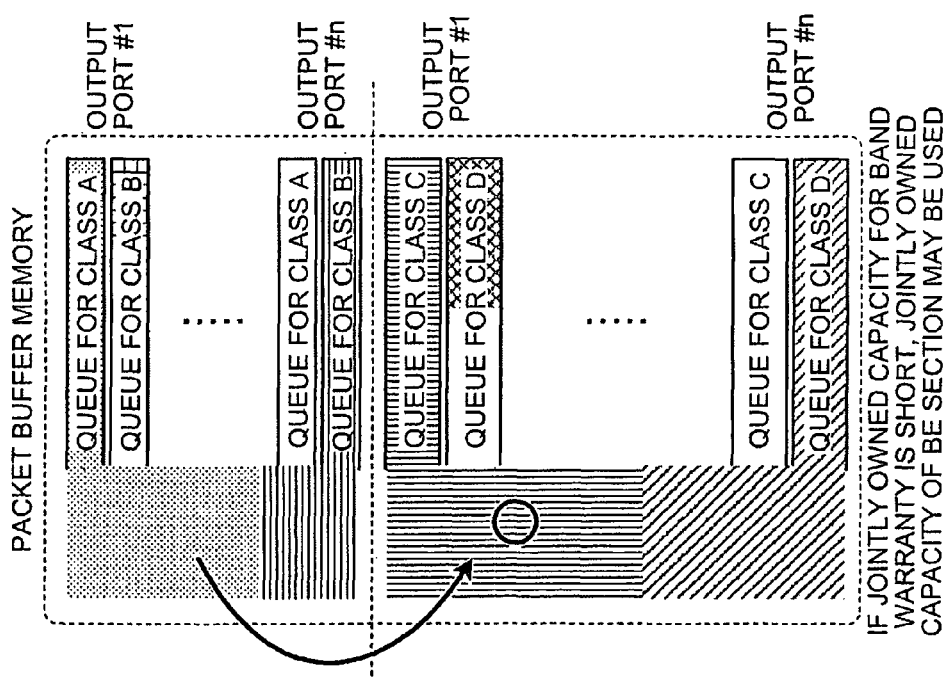

In other words, when, as shown in FIG. 14A, the packet forwarding apparatus according to the second embodiment is set so that due to the congestion of the class for the best effort, the packet of the class for the best effort overflows to the class for the band warranty, the congestion of the class for the band warranty occurs. In contrast to such technique, as shown in FIG. 14B, by storing the positive value as the jointly owned spending capacity with respect to the combination of plural classes for the band warranty between different ports and storing the positive value as the jointly owned spending capacity with respect to the combination of the class for the band warranty and the class for the best effort between the different ports, the packet of the class for the best effort may not spend the jointly owned spending capacity of the class for the band warranty even if there is the congestion of the class for the best effort and as a result, the packet forwarding apparatus according to the second embodiment is capable of avoiding the occurrence of the congestion of the class for the band warranty and preventing the reduction of the congestion resistance of the class for the band warranty.

(5) About Combination

The packet forwarding apparatus according to the second embodiment is not limited to the case of employing only one of the above techniques of distributing the buffer 10 but plural or all techniques may be employed. When there are plural jointly owned spending capacities, presetting may be made of the order of the jointly owned capacities to be spent at the time of storing the packet in the buffer by spending the jointly owned capacity. For example, when there are the capacity jointly owned and spent by "A, B" and the capacity jointly owned and spent by "A, B, C" and the packet of class A is stored in the buffer, firstly, the jointly owned spending capacity owned jointly by the classes for the band warranty ("A, B") may be spent for storing the packet in the buffer and if such jointly owned spending capacity has no free capacity, the jointly owned spending capacity for the best effort ("A, B, C") may be spent for storing the packet in the buffer.

(6) Others

Figure 15B:
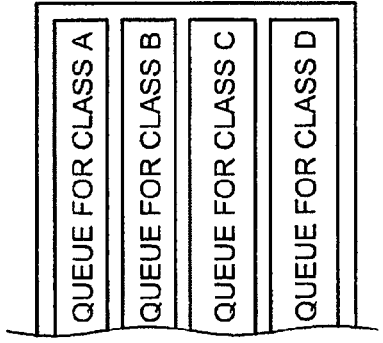
FIGS. 15A and 15B are diagrams for description of the technique of distributing in the second embodiment.
Figure 15A:
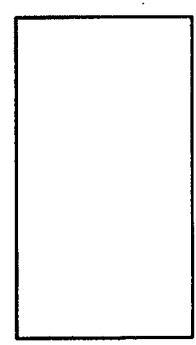

By combining the above techniques of distributing the buffer, the buffer may be efficiently used, as shown below. For example, in the following, description will be made of the effect of setting the dedicated spending capacity with respect to all classes and setting the jointly owned spending capacity between different ports In the conventional technique, as shown in FIG. 15A, when there is no priority (one priority), the buffer 10 has a memory section provided for each output port and within the section, by processing by a FIFO, the packet is read out and transmitted. As shown in FIG. 15B, when there are plural priorities, the priority is identified for each packet and, based on the priority, the packet is stored in the buffer 10 and is read out from the buffer 10 and transmitted. For this reason, the capacity is set for each class.

For example, description will be made of the efficiency of the buffer 10, assuming that the packet is not read out from the buffer 10. In the above conventional technique, in the case of performing the band warranty of 10 msec with respect to GbE, if there is one priority, it is necessary to secure the capacity of 10 Mbits as 10 msec length of 1 Gbit/sec. Furthermore, when the number of output ports is 32, the capacity for the number of ports is required. The buffer 10 capacity of 10 Mbit×32 (port)=320 Mbit is required. In the following calculation, the effect of IFG (Inter Frame Gap) and Preamble/SFD are not taken into consideration.

For example, assuming that there are four classes (priorities) for each port, the ratio of the capacities set for respective classes is given as 1:1:4:4 (A:B:C:D). If the above warranty of 10 msec is applied to class A and class B, ten times memory capacity is required for each port and the memory of as much as 320 Mbit×10=3200 Mbit is required as a result of estimation. In terms of the ratio of capacities, the capacity set for C and D as the class for the best effort is large as compared with the capacity set for A and B as the class for the band warranty. The reason is that the packet of the class for the best effort is caused to wait due to the congestion while the packet of the class for the band warranty is being output and therefore, much capacity is required for C and D.

In contrast to such conventional technique, by applying the present invention, the packet forwarding apparatus according to the second embodiment is capable of efficiently using the buffer 10 by distributing the buffer 10 as described above. Description will be made using, for example, FIG. 16. Firstly, with respect to port "#1" class A, description will be made on the assumption that 10 msec of GbE is warranted in the state in which the packet, after stored in the buffer 10, is not read out for transmission.

Figure 16:
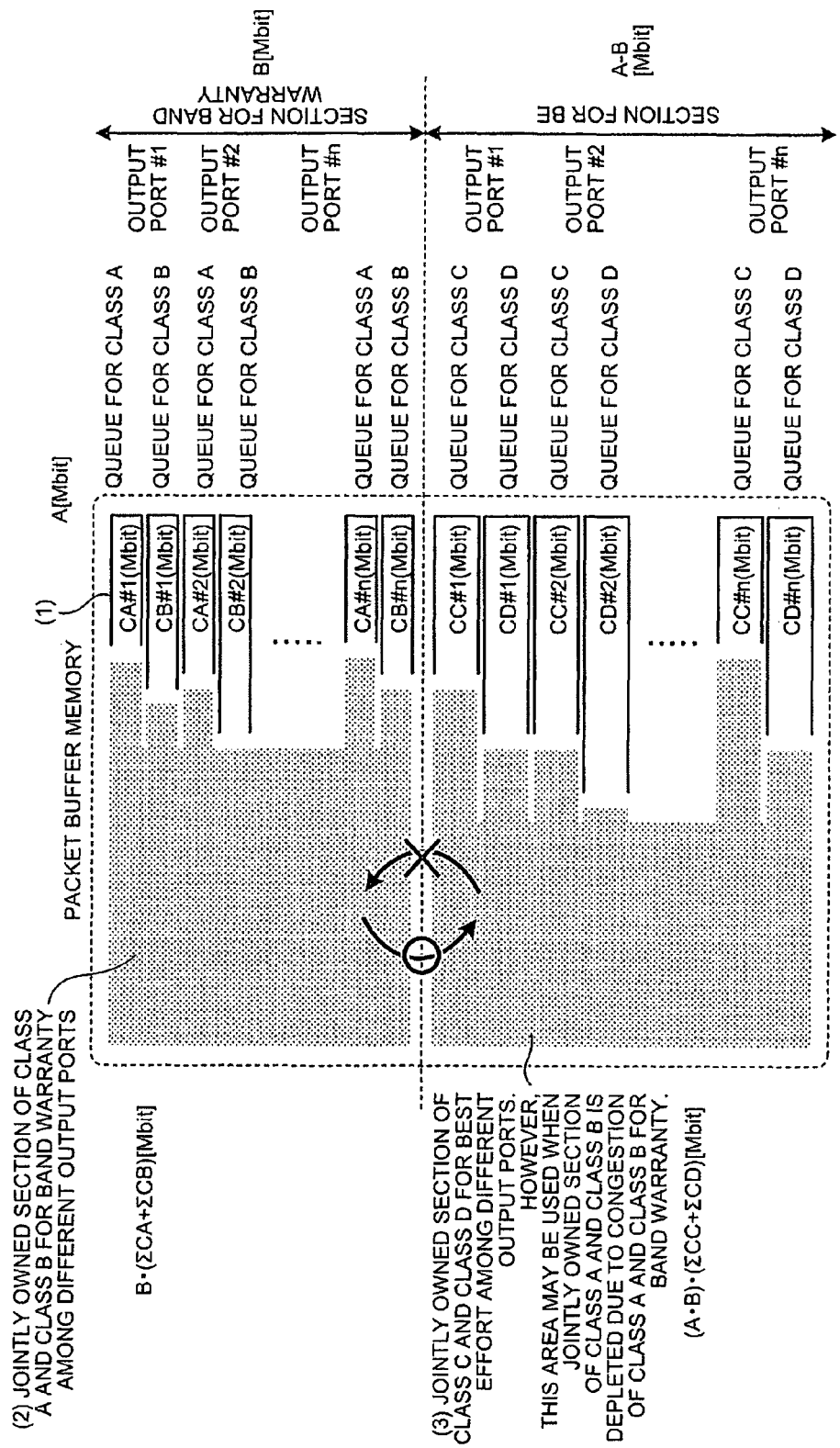
FIG. 16 is a diagram for description of the technique of distributing in the second embodiment.

In this case, upon receipt of the packet of port "#1" class A, the packet forwarding apparatus according to the second embodiment firstly spends the dedicated spending capacity set for port "#1" class A as shown in (1) of FIG. 16, then spends the jointly owned spending capacity of the classes for the band warranty as shown in (2) of FIG. 16, and then spends the jointly owned spending capacity owned and spent jointly by the class for the best effort and the class for the band warranty as shown in (3) of FIG. 16. Namely, this may be expressed by the following equation:

$$CA\#1\ (Mbit)+(B-(\Sigma CA+\Sigma CB))+((A-B)-(\Sigma CC+\Sigma CD))$$
$$=10\ Mbit".$$

By changing the above equation, the memory capacity may be expressed by the following equation:

$$A=10\ Mbit-CA\#1\ (Mbit)+(\Sigma CA+\Sigma CB)+(\Sigma CC+\Sigma CD),$$

where A represents the capacity of the buffer 10, B represents the capacity of the buffer 10 that only the packet of the class for the band warranty is permitted to use, and (A−B) represents the capacity of the buffer 10 that the packet of the class for the best effort is permitted to use. A part indicated by Σ represents the dedicated spending capacity. For example, ΣCA represents the dedicated spending capacity used by class A.

If it is assumed that B is 32 Mbit, CA#1 to CA#n and CB#1 to CB#n are 0.5 Mbit, n=32, and CC#1 to CC#n and CD#1 to CD#n are 1-Mbit, then $$A=10\ Mbit-0.5\ Mbit+(0.5*32+0.5*32)+(1*32+1*32)$$
$$=105.5\ Mbit$$

and as compared with the above conventional technique, the memory of about ⅓ capacity may realize the same band warranty (same specification).

The above equation is calculated as one assumption and as shown by the above equation, if the total sum of the capacity to be dedicated becomes smaller, the buffer 10 may be used more efficiently.

While description has so far been made of the embodiments of the present invention, the present invention may be practiced in various different embodiments other than the above embodiments.

(1) Dynamic Change of Dedicated Spending Capacity

For example, while the embodiments did not refer to the technique of changing the setting of the dedicated spending capacity depending on the configuration of the network, the present invention is not limited to this but it may be so arranged that the setting of the dedicated spending capacity will dynamically be changed depending on the change of the band relative to each output port of the packet forwarding apparatus.

Specifically, the packet forwarding apparatus according to a third embodiment has a SONET monitoring unit to be described below in addition to the configuration shown in FIG. 3. The SONET monitoring unit is coupled to the QoS processing unit 70, the scheduling processing unit 80, the SONET framing processing unit 90, and the SONET deframing processing unit 100, in FIG. 3. The SONET monitoring unit corresponds to a "monitoring unit" and an "updating unit" described in the scope of claims.

Figure 17A:
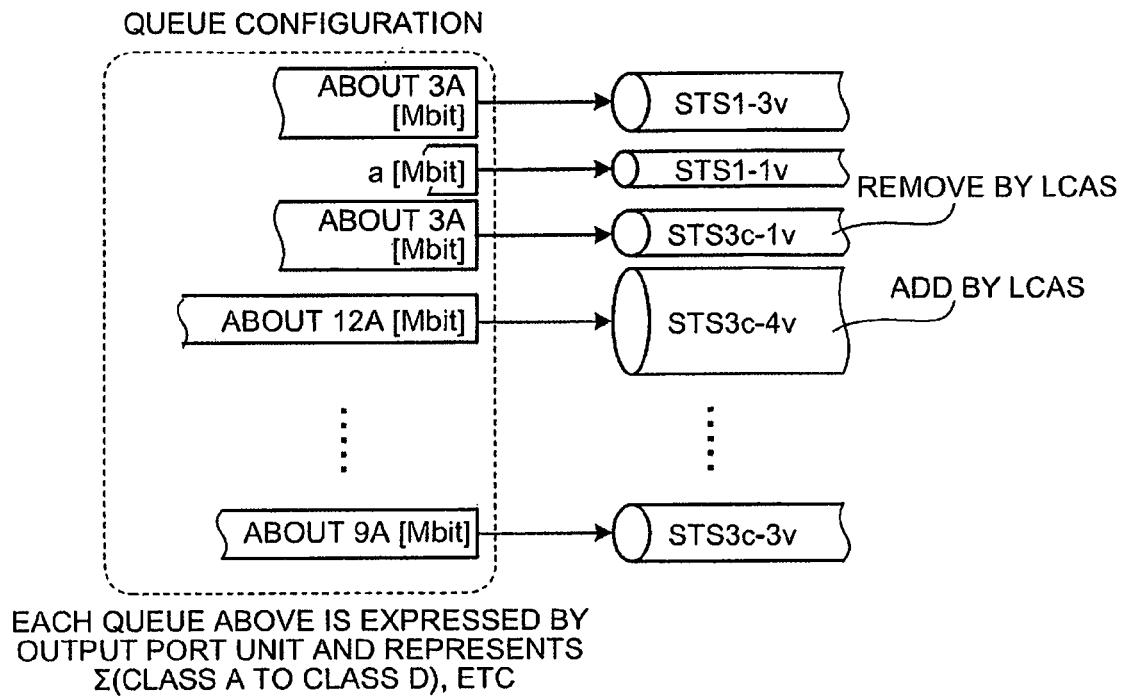
FIGS. 17A and 17B are diagrams for description of the dynamic change by the packet forwarding apparatus according to the third embodiment.
Figure 17B:
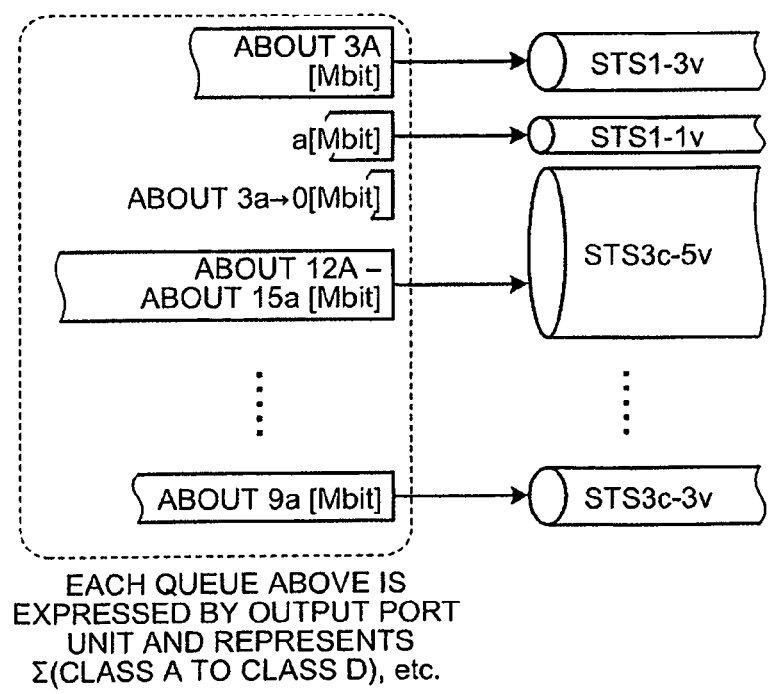

Namely, the packet forwarding apparatus according to the third embodiment (SONET monitoring unit) monitors the bands with respect to respective output ports provided in the packet forwarding apparatus. For example, as shown in FIGS. 17A and 17B, the SONET monitoring unit monitors the band of each output port and monitors the band of port "STS3c-1v" as being lost and the band of port "STS3c-4v" as being increased. FIGS. 17A and 17B are diagrams for description of the dynamic change by the packet forwarding apparatus according to the third embodiment.

The packet forwarding apparatus according to the third embodiment (SONET monitoring unit) updates the dedicated spending capacity of the capacity management table so that the dedicated spending capacity corresponding to the class set at each output port will always be the capacity of a constant ratio relative to the monitored band of the output port. For example, as shown in FIG. 17A, it is assumed that the dedicated spending capacity of "about 3a Mbit" is set for port "STS3c-1v" and the dedicated spending capacity of "about 12a Mbit" is set for port "STS3c-4v". Here, the SONET monitoring unit, as shown in FIG. 17B, updates the dedicated spending capacity set for port "STS3c-1v" from "about 3a Mbit" to "0 Mbit" and updates the dedicated spending capacity set for "STS3c-4v" from "about 12a Mbit" to "about 15a Mbit" (see "STS3c-5v" of FIG. 17B). In other words, the packet forwarding apparatus according to the third embodiment (SONET monitoring unit) updates the setting of the dedicated spending capacity so that, relative to the band of the port (e.g., "STS3c-1v"), the dedicated spending capacity corresponding to such port (for example, in FIG. 17A, "about 3a Mbit") will always be of a constant ratio.

The SONET monitoring unit may perform such updating in a constant cycle. The SONET monitoring unit may have a predetermined threshold and perform the updating when the amount of changer of the band exceeds the threshold.

As seen above, the packet forwarding apparatus according to the third embodiment is capable of making appropriate setting for the configuration of the network.

For example, the packet forwarding apparatus according to the third embodiment enables the queue configuration (assignment of the buffer) dynamically proportional to the band and is capable of securing the compatibility with the band for reading out, by making dynamically changeable each parameter of this packet buffer management system even if there is a dynamic band change of the SONET channel by SONET LCAS.

For example, the packet forwarding apparatus according to the third embodiment is capable of assigning the capacity set for the unused output port to other congested port by changing the dedicated spending capacity or the jointly owned spending capacity based on the change of the configuration of the network and is capable of optimally and efficiently using the buffer 10 not only by the provisioning (presetting) of the apparatus but also by changing even during operation of the apparatus when the warranted band changes.

For example, in the technique without such updating, the dedicated area is not sufficiently secured for the output port that has increased in the band and, due to the congestion of the jointly owned spending capacity by the packet of other port, the packet is discarded even though the band (traffic) does not reach the contract band. In contrast, by the application of the present invention, such situation may be prevented.

By dynamically updating the setting as above, if the memory size is designed taking into account a maximum value of the total sum conceivable as the apparatus of an exclusive band, the packet forwarding apparatus may be made to have the congestion resistance in the operation lower than such value.

Namely, the technique itself of jointly owning and using the buffer is the conventional technology, but by using the above management system, "packet buffer management for QoS" may efficiently be performed. In other words, this is a jointly owned buffer management system for an output band interlock represented by the QoS or LCAS. Specifically, as described in the first embodiment and the second embodiment, the jointly owned spending capacity (jointly owned area) for the band warranty and the jointly owned spending capacity (jointly owned area) for the best effort are provided, and when the jointly owned area for the band warranty is depleted at the time of arrival of the packet of the class for the band warranty, the jointly owned area for the best effort may be used but, even if the jointly owned area for the best effort is depleted at the time of arrival of the packet of the class for the best effort, the jointly owned area for the band warranty may not be used. As described in the second embodiment, even if there is the dynamic band change of the SONET channel by the SONET LCAS, by making dynamically changeable each parameter of this packet buffer management system, the packet forwarding apparatus according to the second embodiment enables the queue configuration dynamically proportional to the band and secures the compatibility with the band for reading out.

(2) System Configuration

The processing procedure, the control procedure, specific names, and information containing various data and parameters (e.g., FIGS. 1 to 16) shown in the above description and drawings may be arbitrarily changed except where specifically indicated.

Each constituent component of each apparatus illustrated by the drawings is function-conceptual and is not necessarily required to be physically composed as illustrated. Namely, a specific form of distribution/integration of each apparatus is not limited to the one illustrated and it may be configured so that all or part thereof is functionally or physically distributed or integrated, by arbitrary unit, depending on various loads and the situation of use. For example, the buffer storage pointer processing unit 140 in FIG. 4 may be separated into the location information management table and a unit managing the table and the buffer writing processing unit 120 and the buffer reading processing unit 130 may be integrated. Further, each processing function performed in each apparatus may have all or an arbitrary part thereof realized by a CPU and a program analyzed and executed by the CPU or realized as hardware by a wired logic.

(3) Program

Figure 18:
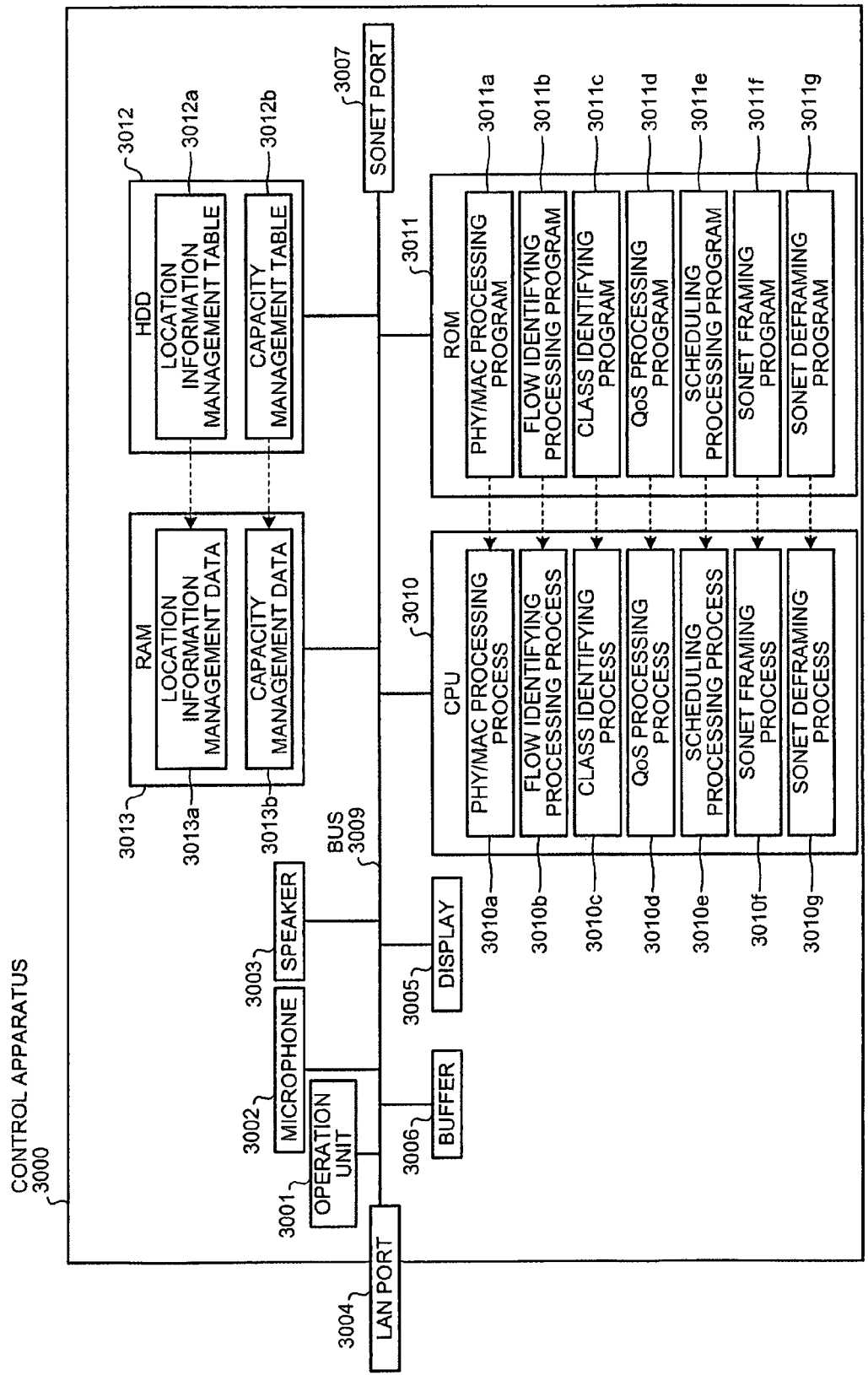
FIG. 18 is a diagram of the program of the packet forwarding apparatus according to the first embodiment.

While in the first embodiment, description is made of the case of realizing various processing by the hardware logic, the present invention is not limited to this but it may be so arranged that various processing is realized by executing a prearranged program on a computer. Accordingly, in the following, description will be made of one example of the computer executing a packet forwarding apparatus control program having the same function as that of the packet forwarding apparatus shown in the first embodiment, using FIG. 18. FIG. 18 is a diagram of the program of the packet forwarding apparatus according to the first embodiment.

As shown in FIG. 18, a control apparatus 3000 comprises an operation unit 3001, a microphone 3002, a speaker 3003, a LAN port 3004, a display 3005, a buffer 3006, a SONET port 3007, the CPU 3010, a ROM 3011, an HDD 3012, and a RAM 3013, all connected by a bus 3009, etc.

The ROM 3011 stores in advance the control program achieving the same functions as those of the PHY/MAC processing unit 40, the flow identifying processing unit 50, the class identifying processing unit 60, the QoS processing unit 70, the scheduling processing unit 80, the SONET framing processing unit 90, and the SONET deframing processing unit 100 shown in the first embodiment, namely, a PHY/MAC processing program 3011*a*, a flow identifying processing program 3011*b*, a class identifying program 3011*c*, a QoS processing program 3011*d*, a scheduling processing program 3011*e*, a SONET framing program 3011*f*, and a SONET deframing program 3011*g*, as shown in FIG. 18. The programs 3011*a* to 3011*g* may appropriately be integrated or separated in the same manner as the constituent components of the control apparatus shown in FIG. 3.

With the CPU 3010 reading out these programs 3011*a* to 3011*g* from the ROM 3011 and executing them, these programs 3011*a* to 3011*g* come to function as a PHY/MAC processing process 3010*a*, a flow identifying processing process 3010*b*, a class identifying process 3010*c*, a QoS processing process 3010*d*, a scheduling processing process 3010*e*, a SONET framing process 3010*f*, and a SONET deframing process 3010*g*, as shown in FIG. 18. The processes 3010*a* to 3010*g* correspond to the PHY/MAC processing unit 40, the flow identifying processing unit 50, the class identifying processing unit 60, the QoS processing unit 70, the scheduling processing unit 80, the SONET framing processing unit 90, and the SONET deframing processing unit 100, respectively, shown in FIG. 3.

A location information management table 3012*a* and a capacity management table 3012*b* are provided in the HDD 3012. The location information management table 3012*a* corresponds to the location information management table and the capacity management table 3012*b* corresponds to the capacity management table.

The CPU 3010 reads out the location information management table 3012*a* and the capacity management table 3012*b* from the HDD 3012, stores them in the RAM 3013, and executes the packet forwarding apparatus control program, using location information management data 3013*a* and capacity management data 3013*b* stored in the RAM 3013.

(3) Others

The packet forwarding apparatus control method described in the present embodiments may be realized by executing the prearranged program on the computer such as a personal computer and a work station. This program may also be executed by being recorded on a computer-readable recording medium such as a hard disc, a flexible disc (FD), a CD-ROM, and a DVD and being read out from the recording medium by the computer.

The disclosed packet forwarding apparatus is capable of decreasing opportunity of discarded packets while using the buffer efficiently and maintaining the band control based on the class (packet transmission processing by the priority control based on the class).

The disclosed packet forwarding apparatus is capable of improving the burst resistance and using the buffer efficiently without increasing the buffer for the band warranty, by storing the packet classified into the band warranty class in the buffer for the best effort even if the buffer for the band warranty has no free capacity. The disclosed packet forwarding apparatus is also capable of maintaining the band control based on the class (packet transmission processing by the priority control based on the class).

The disclosed packet forwarding apparatus is also capable of preventing entire discard of the packet for the best effort.

The disclosed packet forwarding apparatus is also capable of using the buffer efficiently as compared with a technique of not jointly owning (exclusively owning) the capacity among classes for the band warranty.

The disclosed packet forwarding apparatus, which, for example, stores a positive value as a dedicated spending capacity with respect to the class for the band warranty, is also capable of preventing the entire discard of the classes for the band warranty also at the time of setting the jointly owned spending capacity with respect to a combination of the classes for the band warranty.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A packet forwarding apparatus having plural ports that, upon receipt of a packet pre-classified with respect to a priority control, stores the packet in a buffer and then transmits it based on the priority control, the apparatus comprising:
    a first storage that, with respect to the packets currently stored in the buffer, stores, by the port and by the class, order information indicating the order in which the packet has been received and location information specifying at which location of the buffer the received packet is stored, in correspondence therewith;
    a transmitter that selects a predetermined port and class according to the priority control, reads out the packet stored foremost corresponding to the selected port and class out of the packets currently stored in the buffer from the buffer, using the order information and the location information stored in the first storage, and transmits it;
    a second storage that stores, by the port and by the class, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith;
    a third storage that stores, by combination of classes between different ports and by combination of plural classes, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith; and
    a processor that is operative to:
    identify the port and the class of the received packet;
    read out the dedicated free capacity corresponding to the port and the class identified from the second storage, determine whether there is the capacity for storing the received packet and, if it is determined that there is the capacity for storing the packet, store the packet in the buffer, treating the dedicated free capacity of the port and the class as having been spent;
    if it is determined that there is no capacity for storing the received packet, read out the jointly owned free capacity corresponding to the port and the class of the packet from the third storage, determine whether there is the capacity for storing the packet, and, if it is determined that there is the capacity for storing the packet, store the packet in the buffer, treating the jointly owned free capacity of the port and the class as having been spent; and
    if it is determined that there is no capacity for storing the received packet, discard the packet without storing it in the buffer, wherein
    the third storage stores a first positive value as the jointly owned spending capacity with respect to a combination of plural classes for the band warranty between different ports and stores a second positive value as the jointly owned spending capacity with respect to a combination of the class for the band warranty and the class for the best effort between different ports.

2. The packet forwarding apparatus according to claim 1, wherein
    the class is a class for band warranty used in packet communication with warranted band and a class for best effort used in the packet communication with unwarranted band, wherein
    the second storage stores a positive value as the dedicated spending capacity at least with respect to the class for the band warranty, and wherein
    the third storage stores a positive value as the jointly owned spending capacity with respect to a combination of the classes for the band warranty and for the best effort.

3. The packet forwarding apparatus according to claim 1, wherein
    the second storage stores a positive value as the dedicated spending capacity with respect to the class for the best effort.

4. The packet forwarding apparatus according to claim 1, wherein
    at least the class for the band warranty is of plural number, and wherein
    the third storage stores a positive value as the jointly owned spending capacity with respect to a combination of the classes for the band warranty.

5. The packet forwarding apparatus according to claim 4, wherein
    when a positive value is stored as the jointly owned spending capacity by the third storage with respect to the combination of the classes for the band warranty, the second storage stores a positive value as the dedicated spending capacity with respect to each of the classes.

6. A packet forwarding apparatus that, upon receipt of a packet pre-classified with respect to a priority control, stores the packet in a buffer and then transmits it based on the priority control, the apparatus comprising:
- a first storage that, with respect to the packets currently stored in the buffer, stores, by the class, order information indicating the order in which the packet has been received and location information specifying at which location of the buffer the received packet is stored, in correspondence therewith;
- a transmitter that selects a predetermined class according to the priority control, reads out the packet stored foremost corresponding to the selected class out of the packets currently stored in the buffer from the buffer, using the order information and the location information stored in the first storage, and transmits it;
- a second storage that stores, by the class, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith;
- a third storage that stores, by combination of plural classes, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith;
- a monitor that monitors the band with respect to each of the output ports provided in the packet forwarding apparatus; and
- a processor that is operative to
- identify the class of the received packet;
- read out the dedicated free capacity corresponding to the class identified from the second storage, determine whether there is the capacity for storing the received packet and, if it is determined that there is the capacity for storing the packet, store the packet in the buffer, treating the dedicated free capac of the class as having been spent;
- if it is determined that there is no capacity for storing the received packet, read out the jointly owned free capacity corresponding to the class of the packet from the third storage, determine whether there is the capacity for storing the packet, and, if it is determined that there is the capacity for storing the packet, store the packet in the buffer, treating the jointly owned free capacity of the class as having been spent; and
- if it is determined that there is no capacity for storing the received packet, discard the packet without storing it in the buffer; and
- update the dedicated spending capacity so that the dedicated spending capacity corresponding to the class set at each output port will always be the capacity of a constant ratio relative to the band of the output port monitored by the monitor.

7. A method for controlling a packet forwarding apparatus having plural ports that, upon receipt of a packet pre-classified with respect to a priority control, stores the packet in a buffer and then transmits it based on the priority control, the method comprising:
- with respect to the packets currently stored in the buffer, first storing, by the port and by the class, in a location information table, order information indicating the order in which the packet has been received and location information specifying at which location of the buffer the received packet is stored, in correspondence therewith;
- selecting a predetermined port and class according to the priority control;
- reading out the packet stored foremost corresponding to the selected port and class out of the packets currently stored in the buffer from the buffer, using the order information and the location information stored in the first storing;
- transmitting the packet read out;
- second storing, by the port and by the class, in a dedicated table, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith;
- third storing, by combination of classes between different ports and by combination of plural classes, in a jointly owned table, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith;
- identifying the port and the class of the received packet;
- reading out the dedicated free capacity corresponding to the identified port and class from the dedicated table, determines whether there is the capacity for storing the received packet and, if it is determined that there is the capacity for storing the packet, stores the packet in the buffer, treating the dedicated free capacity of the port and the class as having been spent;
- reading out, if it is determined that there is no capacity for storing the received packet, the jointly owned free capacity corresponding to the port and the class of the packet from the jointly owned table;
- determining whether there is the capacity for storing the packet, and, if it is determined that there is the capacity for storing the packet, storing the packet in the buffer to treat the jointly owned free capacity of the port and the class as having been spent; and
- discarding, if it is determined that there is no capacity for storing the received packet, the packet without storing it in the buffer, wherein
- the third storing includes storing a first positive value as the jointly owned spending capacity with respect to a combination of plural classes for the band warranty between different ports and storing a second positive value as the jointly owned spending capacity with respect to a combination of the class for the band warranty and the class for the best effort between different ports.

8. A computer program product having a non-transitory computer readable medium including programmed instructions for controlling a packet forwarding apparatus having plural ports that, upon receipt of a packet pre-classified with respect to a priority control, stores the packet in a buffer and then transmits it based on the priority control, wherein the instructions, when executed by a computer, cause the computer to perform:

with respect to the packets currently stored in the buffer, first storing, by the port and by the class, in a location information table, order information indicating the order in which the packet has been received and location information specifying at which location of the buffer the received packet is stored, in correspondence therewith;

selecting a predetermined port and class according to the priority control;

reading out the packet stored foremost corresponding to the selected port and class out of the packets currently stored in the buffer from the buffer, using the order information and the location information stored in the first storing;

transmitting the packet read out; second storing, by the port and by the class, in a dedicated table, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith;

third storing, by combination of classes between different ports and by combination of plural classes, in a jointly owned table, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith;

identifying the port and the class of the received packet; reading out the dedicated free capacity corresponding to the identified port and class from the dedicated table, determines whether there is the capacity for storing the received packet and, if it is determined that there is the capacity for storing the packet, stores the packet in the buffer, treating the dedicated free capacity of the port and the class as having been spent;

reading out, if it is determined that there is no capacity for storing the received packet, the jointly owned free capacity corresponding to the port and the class of the packet from the jointly owned table;

determining whether there is the capacity for storing the packet, and, if it is determined that there is the capacity for storing the packet, storing the packet in the buffer to treat the jointly owned free capacity of the port and the class as having been spent; and discarding, if it is determined that there is no capacity for storing the received packet, the packet without storing it in the buffer, wherein the third storing includes storing a first positive value as the jointly owned spending capacity with respect to a combination of plural classes for the band warranty between different ports and storing a second positive value as the jointly owned spending capacity with respect to a combination of the class for the band warranty and the class for the best effort between different ports.

9. A method for controlling a packet forwarding apparatus that, upon receipt of a packet pre-classified with respect to a priority control, stores the packet in a buffer and then transmits it based on the priority control, the method comprising:

with respect to the packets currently stored in the buffer, first storing, by the class, in a location information table, order information indicating the order in which the packet has been received and location information specifying at which location of the buffer the received packet is stored, in correspondence therewith;

selecting a predetermined class according to the priority control;

reading out the packet stored foremost corresponding to the selected class out of the packets currently stored in the buffer from the buffer, using the order information and the location information stored in the first storing;

transmitting the packet read out;

second storing, by the class, in a dedicated table, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith;

third storing, by combination of plural classes, in a jointly owned table, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith;

identifying the class of the received packet;

reading out the dedicated free capacity corresponding to the identified class from the dedicated table, determines whether there is the capacity for storing the received packet and, if it is determined that there is the capacity for storing the packet, stores the packet in the buffer, treating the dedicated free capacity of the class as having been spent;

reading out, if it is determined that there is no capacity for storing the received packet, the jointly owned free capacity corresponding to the class of the packet from the jointly owned table;

determining whether there is the capacity for storing the packet, and, if it is determined that there is the capacity for storing the packet, storing the packet in the buffer to treat the jointly owned free capacity of the class as having been spent; and discarding, if it is determined that there is no capacity for storing the received packet, the packet without storing it in the buffer, monitoring the band with respect to each of the output ports provided in the packet forwarding apparatus; and updating the dedicated spending capacity so that the dedicated spending capacity corresponding to the class set at each output port will always be the capacity of a constant ratio relative to the band of the output port monitored by the monitoring.

10. A computer program product having a non-transitory computer readable medium including programmed instructions for controlling a packet forwarding apparatus that, upon receipt of a packet pre-classified with respect to a priority control, stores the packet in a buffer and then transmits it based on the priority control, wherein the instructions, when executed by a computer, cause the computer to perform:

with respect to the packets currently stored in the buffer, first storing, by the class, in a location information table, order information indicating the order in which the packet has been received and location information specifying at which location of the buffer the received packet is stored, in correspondence therewith;

selecting a predetermined class according to the priority control;

reading out the packet stored foremost corresponding to the selected class out of the packets currently stored in the buffer from the buffer, using the order information and the location information stored in the first storing;

transmitting the packet read out;

second storing, by the class, in a dedicated table, a dedicated spending capacity indicating the capacity that only the packet of the class is permitted to spend out of the capacity of the buffer, and at least one of a current dedicated spending capacity indicating the capacity currently spent out of the dedicated spending capacity and a dedicated free capacity obtainable by subtracting the current dedicated spending capacity from the dedicated spending capacity, in correspondence therewith;

third storing, by combination of plural classes, in a jointly owned table, a jointly owned spending capacity indicating the capacity that packets of the plural classes are permitted to jointly own and spend out of the capacity of the buffer, and at least one of a current jointly owed spending capacity indicating the capacity currently spent out of the jointly owned spending capacity and a jointly owned free capacity obtainable by subtracting the current jointly owned spending capacity from the jointly owned spending capacity, in correspondence therewith;

identifying the class of the received packet;

reading out the dedicated free capacity corresponding to the identified class from the dedicated table, determines whether there is the capacity for storing the received packet and, if it is determined that there is the capacity for storing the packet, stores the packet in the buffer, treating the dedicated free capacity of the class as having been spent;

reading out, if it is determined that there is no capacity for storing the received packet, the jointly owned free capacity corresponding to the class of the packet from the jointly owned table;

determining whether there is the capacity for storing the packet, and, if it is determined that there is the capacity for storing the packet, storing the packet in the buffer to treat the jointly owned free capacity of the class as having been spent; and discarding, if it is determined that there is no capacity for storing the received packet, the packet without storing it in the buffer monitoring the band with respect to each of the output ports provided in the packet forwarding apparatus; and updating the dedicated spending capacity so that the dedicated spending capacity corresponding to the class set at each output port will always be the capacity of a constant ratio relative to the band of the output port monitored by the monitoring.

* * * * *

UNITED STATES PATENT AND TRADEMARK OFFICE
CERTIFICATE OF CORRECTION

PATENT NO. : 8,254,403 B2
APPLICATION NO. : 12/285366
DATED : August 28, 2012
INVENTOR(S) : Haruhiko Hashimoto It is certified that error appears in the above-identified patent and that said Letters Patent is hereby corrected as shown below:

Column 29, Line 45, In Claim 6, delete "capac" and insert -- capacity --, therefor.

Signed and Sealed this
Twentieth Day of November, 2012

David J. Kappos
*Director of the United States Patent and Trademark Office*